US012562306B2

(12) United States Patent
Jin et al.

(10) Patent No.: US 12,562,306 B2
(45) Date of Patent: Feb. 24, 2026

(54) MAGNETIC DEVICE AND ELECTRONIC DEVICE WITH SAME

(71) Applicant: Delta Electronics, Inc., Taoyuan (TW)

(72) Inventors: Da Jin, Shanghai (CN); Xueliang Chang, Shanghai (CN); Litao Qian, Shanghai (CN); Shengli Lu, Shanghai (CN); Yahong Xiong, Shanghai (CN)

(73) Assignee: Delta Electronics, Inc., Taoyuan (TW)

( * ) Notice: Subject to any disclaimer, the term of this patent is extended or adjusted under 35 U.S.C. 154(b) by 615 days.

(21) Appl. No.: 18/094,745

(22) Filed: Jan. 9, 2023

(65) Prior Publication Data

US 2023/0238173 A1    Jul. 27, 2023

(30) Foreign Application Priority Data

Jan. 26, 2022    (CN) .......................... 202210094553.2

(51) Int. Cl.
| | |
|---|---|
| *H01F 27/28* | (2006.01) |
| *H01F 27/30* | (2006.01) |
| *H01F 37/00* | (2006.01) |
| *H02M 3/00* | (2006.01) |
| *H02M 3/335* | (2006.01) |

(52) U.S. Cl.
CPC ....... *H01F 27/306* (2013.01); *H01F 27/2804* (2013.01); *H01F 37/00* (2013.01); *H02M 3/003* (2021.05); *H02M 3/33569* (2013.01)

(58) Field of Classification Search
CPC .... H01F 27/306; H01F 27/2804; H01F 37/00; H01F 27/40; H01F 17/0013; H01F 17/04;

H01F 27/24; H01F 27/38; H02M 3/003; H02M 3/33569; H02M 1/0095; H02M 3/01; H02M 3/07; H02M 3/1584
USPC ................................... 336/212, 221, 83, 220
See application file for complete search history.

(56) References Cited

U.S. PATENT DOCUMENTS 6,792,666 B1 * 9/2004 Bolotinsky ............. H01F 27/25
336/60
11,270,832 B2 3/2022 Li
(Continued)

FOREIGN PATENT DOCUMENTS

CN        111711358 A      9/2020
CN        211719418 U      10/2020
(Continued)

*Primary Examiner* — Shawki S Ismail
*Assistant Examiner* — Kazi S Hossain
(74) *Attorney, Agent, or Firm* — KIRTON McCONKIE; Evan R. Witt

(57) ABSTRACT

A magnetic device and an electronic device are provided. The magnetic device includes a magnetic core assembly and a winding assembly. The magnetic core assembly includes a first magnetic cover, a second magnetic cover, a first magnetic leg and a second magnetic leg. The first magnetic leg and the second magnetic leg are between the first magnetic cover and the second magnetic cover. A channel is formed between the first magnetic leg and the second magnetic leg. The winding assembly includes two coupled windings. Each coupled winding includes a first sub-winding, a second sub-winding, a third sub-winding. The first sub-winding goes through the channel. The second sub-winding is wound around the first magnetic leg. The third sub-winding is wound around the second magnetic leg.

23 Claims, 15 Drawing Sheets

(56)             References Cited

U.S. PATENT DOCUMENTS

| 2010/0232181 | A1* | 9/2010 | Nakahori | ............ | H01F 27/2804 |
|---|---|---|---|---|---|
| | | | | | 336/221 |
| 2018/0076726 | A1* | 3/2018 | Hsiao | .................... | H02M 7/003 |
| 2020/0027642 | A1* | 1/2020 | Tsai | ........................ | H01F 27/40 |
| 2021/0407729 | A1* | 12/2021 | Yan | ......................... | H01F 41/04 |
| 2022/0294339 | A1* | 9/2022 | Xiong | ................... | H05K 1/181 |

FOREIGN PATENT DOCUMENTS

| CN | 112038053 A | 12/2020 |
|---|---|---|
| CN | 112104201 A | 12/2020 |

* cited by examiner

MAGNETIC DEVICE AND ELECTRONIC DEVICE WITH SAME

CROSS-REFERENCE TO RELATED APPLICATION

This application claims priority to China Patent Application No. 202210094553.2, filed on Jan. 26, 2022, the entire contents of which are incorporated herein by reference for all purposes.

FIELD OF THE INVENTION

The present disclosure relates to a magnetic device, and more particularly to a magnetic device for an electronic device.

BACKGROUND OF THE INVENTION

With the advancement of Internet, cloud computing technologies, electric vehicle technologies, industrial automation technologies and associated technologies, the demands for electric power gradually increase. Accordingly, the demands for power sources are also increased. Consequently, the electronic device has to be developed toward high power density and high efficiency. In order to meet the power requirements of high efficiency and high power density, the current way is to increase the bus voltage of the electronic device (e.g., a power conversion module) from 12V to 48V. Consequently, the current loss on the bus and the cost of the bus are reduced. For achieving the purpose of power conversion, a power conversion module with two stage converters (e.g., a fixed-ratio converter and a buck converter) is employed to increase the bus voltage from 12V to 48V. However, the efficiency of the power conversion module with two stage converters is low, and the applications thereof are limited.

Therefore, there is a need of providing an improved magnetic device and an electronic device with the magnetic device in order to overcome the drawbacks of the conventional technologies.

SUMMARY OF THE INVENTION

An object of the present disclosure is to provide a magnetic device with small volume, high efficiency and lower loss.

Another object of the present disclosure is to provide an electronic device with the magnetic device.

In accordance with an aspect of the present disclosure, a magnetic device is provided. The magnetic device includes a magnetic core assembly and a winding assembly. The magnetic core assembly includes a first lateral side, a second lateral side, a third lateral side, a fourth lateral side, a first magnetic cover, a second magnetic cover, a first magnetic leg and a second magnetic leg. The first lateral side and the second lateral side are opposite to each other. The third lateral side and the fourth lateral side are opposite to each other. The third lateral side and the fourth lateral side are arranged between the first lateral side and the second lateral side. The first magnetic cover and the second magnetic cover are opposite to each other. The first magnetic leg is arranged between a first end of the first magnetic cover and a first end of the second magnetic cover. The second magnetic leg is arranged between a second end of the first magnetic cover and a second end of the second magnetic cover. A channel is formed between the first magnetic leg and the second magnetic leg. The channel is in communication with the third lateral side and the fourth lateral side of the magnetic core assembly. The winding assembly includes two coupled windings. Each coupled winding includes a first sub-winding, a second sub-winding and a third sub-winding. A first terminal of the first sub-winding is located beside the fourth lateral side of the magnetic core assembly. A second terminal of the first sub-winding is located beside the third lateral side of the magnetic core assembly. The first sub-winding goes through the channel. A first terminal of the second sub-winding is connected with the second terminal of the first sub-winding and located beside the third lateral side of the magnetic core assembly. A second terminal of the second sub-winding is located beside the fourth lateral side of the magnetic core assembly. A portion of the second sub-winding is further located beside the first lateral side of the magnetic core assembly. The second sub-winding is wound around the first magnetic leg. A first terminal of the third sub-winding is connected with the second terminal of the first sub-winding. The first terminal of the third sub-winding is located beside the third lateral side of the magnetic core assembly. A second terminal of the third sub-winding is located beside the fourth lateral side of the magnetic core assembly. A portion of the third sub-winding is further located beside the second lateral side of the magnetic core assembly. The third sub-winding is wound around the second magnetic leg. The second terminal of the third sub-winding is connected with the second terminal of the second sub-winding.

In accordance with another aspect of the present disclosure, an electronic device is provided. The electronic device includes a circuit board and a magnetic device. The circuit board has a first surface and a second surface. The first surface and the second surface are opposite to each other. The magnetic device includes a magnetic core assembly and a winding assembly. The magnetic core assembly includes a first lateral side, a second lateral side, a third lateral side, a fourth lateral side, a first magnetic cover, a second magnetic cover, a first magnetic leg and a second magnetic leg. The first lateral side and the second lateral side are opposite to each other. The third lateral side and the fourth lateral side are opposite to each other. The third lateral side and the fourth lateral side are arranged between the first lateral side and the second lateral side. The first magnetic cover and the second magnetic cover are opposite to each other. The first magnetic leg is arranged between a first end of the first magnetic cover and a first end of the second magnetic cover. The second magnetic leg is formed between a second end of the first magnetic cover and a second end of the second magnetic cover. A channel is arranged between the first magnetic leg and the second magnetic leg. The channel is in communication with the third lateral side and the fourth lateral side of the magnetic core assembly. The winding assembly is disposed within the circuit board. The winding assembly includes two coupled windings. Each coupled winding includes a first sub-winding, a second sub-winding and a third sub-winding. A first terminal of the first sub-winding is located beside the fourth lateral side of the magnetic core assembly. A second terminal of the first sub-winding is located beside the third lateral side of the magnetic core assembly. The first sub-winding goes through the channel. A first terminal of the second sub-winding is connected with the second terminal of the first sub-winding and located beside the third lateral side of the magnetic core assembly. A second terminal of the second sub-winding is located beside the fourth lateral side of the magnetic core assembly. A portion of the second sub-winding is further located beside the first lateral side of the magnetic core assembly. The second sub-winding is wound around the first magnetic leg. A first terminal of the third sub-winding is connected with the second terminal of the first sub-winding. The first terminal of the third sub-winding is located beside the third lateral side of the magnetic core assembly. A second terminal of the third sub-winding is located beside the fourth lateral side of the magnetic core assembly. A portion of the third sub-winding is further located beside the second lateral side of the magnetic core assembly. The third sub-winding is wound around the second magnetic leg. The second terminal of the third sub-winding is connected with the second terminal of the second sub-winding.

The present disclosure provides a power conversion module. The magnetic core assembly and the winding assembly of the magnetic device in the power conversion module are specially designed. Consequently, the voltage reduction functions of the transformer can be achieved. Moreover, the volume of the magnetic device is effectively reduced, and the integration of the magnetic device is enhanced. Consequently, the power conversion module has the advantages of low output ripple, small volume, high efficiency and simplified applications. Moreover, the arrangement of the plurality of coupled windings is specially designed. Consequently, the coupling coefficient of the plurality of coupled windings is largely increased, the leakage inductance of the plurality of coupled windings is reduced, and the DC/AC loss of the plurality of coupled windings is largely reduced. Moreover, due to the arrangement of the electroplated structures, different layers of driving transformer can be electrically connected with each other. Consequently, the layout space of the driving transformer on the circuit board is reduced.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
FIG. 1A is a schematic perspective view illustrating the structure of a power conversion module according to a first embodiment of the present disclosure.
Figure 1B:
FIG. 1B is a schematic perspective view illustrating the power conversion module as shown in FIG. 1A and taken along another viewpoint.
Figure 1C:
FIG. 1C is a schematic exploded view illustrating the power conversion module as shown in FIG. 1A.
Figure 2:
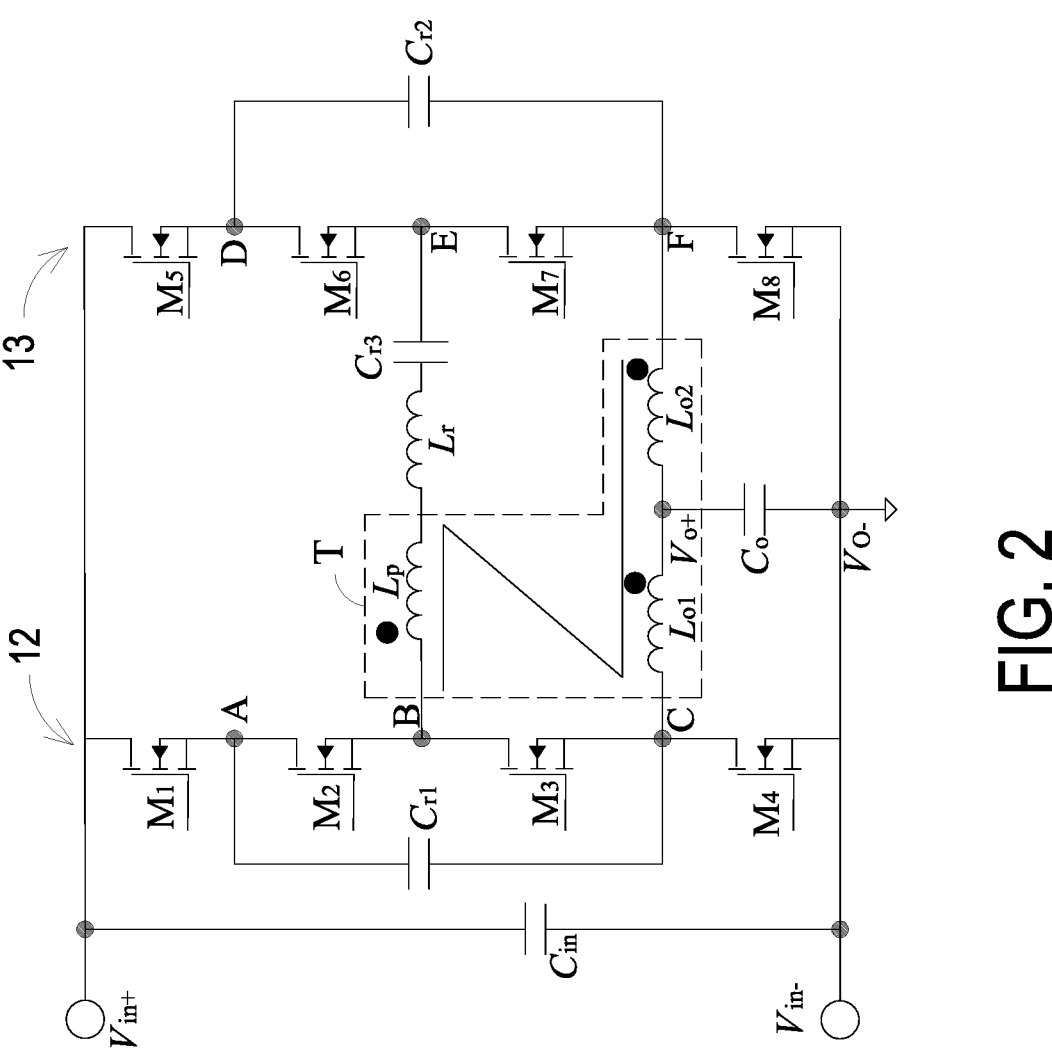
FIG. 2 is a schematic circuit diagram illustrating the circuitry topology of the power conversion module as shown in FIG. 1A.
Figure 3:
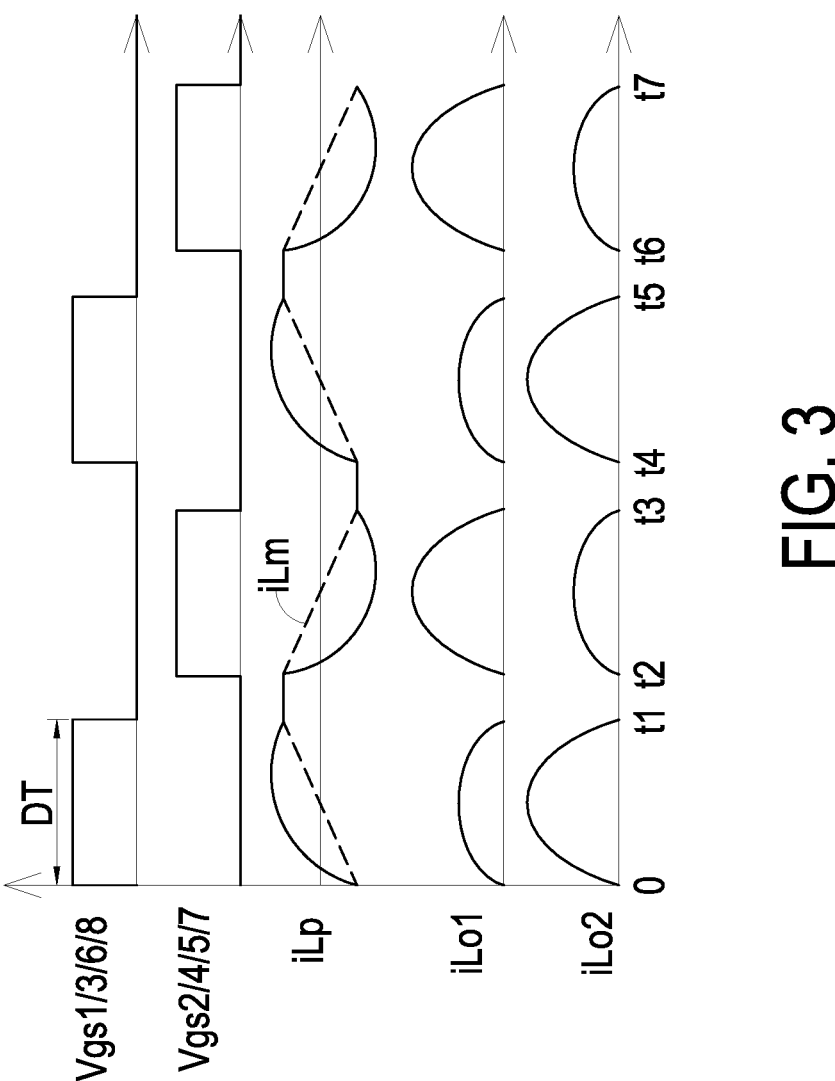
FIG. 3 is a schematic timing waveform diagram illustrating associated voltage signals of the power conversion module as shown in FIG. 1A.
Figure 4:
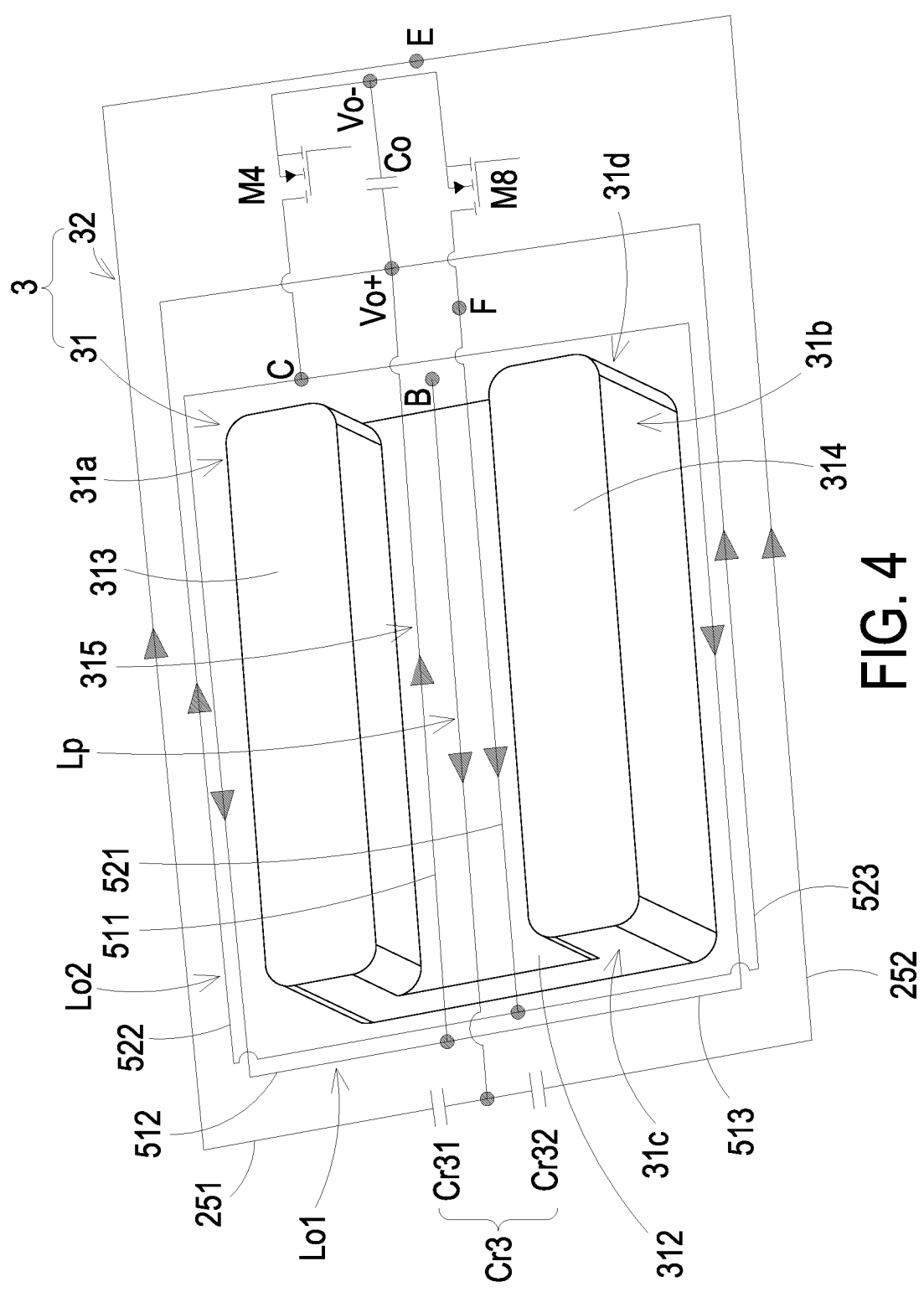
FIG. 4 schematically illustrates the first magnetic core assembly and the first winding assembly of the power conversion module as shown in FIG. 1A, in which the first magnetic cover is not shown.

Please refer to FIGS. 1A, 1B, 1C, 2, 3 and 4. FIG. 1A is a schematic perspective view illustrating the structure of a power conversion module according to a first embodiment of the present disclosure. FIG. 1B is a schematic perspective view illustrating the power conversion module as shown in FIG. 1A and taken along another viewpoint. FIG. 1C is a schematic exploded view illustrating the power conversion module as shown in FIG. 1A. FIG. 2 is a schematic circuit diagram illustrating the circuitry topology of the power conversion module as shown in FIG. 1A. FIG. 3 is a schematic timing waveform diagram illustrating associated voltage signals of the power conversion module as shown in FIG. 1A. FIG. 4 schematically illustrates the first magnetic core assembly and the first winding assembly of the power conversion module as shown in FIG. 1A, in which the first magnetic cover is not shown.

As shown in FIG. 2, a switching-capacitor resonant buck circuit is used for the power conversion module 1, and the power conversion module 1 can be an electronic device. The power conversion module 1 includes an input positive terminal Vin+, an input negative terminal Vin−, an output positive terminal Vo+, an output negative terminal Vo−, an input capacitor Cin, a first bridge arm 12, a second bridge arm 13, a transformer T, a first resonant capacitor Cr1, a second resonant capacitor Cr2, a third resonant capacitor Cr3, a resonant inductor Lr and an output capacitor Co. The input negative terminal Vin− and the output negative terminal Vo− are directly connected with each other. The first terminal of the input capacitor Cin is connected with the input positive terminal Vin+, and the second terminal of the input capacitor Cin is connected with the input negative terminal Vin−.

The first bridge arm 12 is connected with the input capacitor Cin in parallel. The first bridge arm 12 includes a first switch M1, a second switch M2, a third switch M3 and a fourth switch M4, which are sequentially connected in series between the input positive terminal Vin+ and the input negative terminal Vin–. The first switch M1 is electrically connected with the input positive terminal Vin+. The fourth switch M4 is electrically connected with the input negative terminal Vin–. Moreover, the fourth switch M4 is a first ground switch. The source terminal of the first switch M1 and the drain terminal of the second switch M2 are connected with a first node A. The source terminal of the second switch M2 and the drain terminal of the third switch M3 are connected with a second node B. The source terminal of the third switch M3 and the drain terminal of the fourth switch M4 are connected with a third node C. Preferably but not exclusively, the switches M1, M2, M3 and M4 of the first bridge arm 12 are MOSFET switches, SiC switches or GaN switches.

The second bridge arm 13, the first bridge arm 12 and the input capacitor Cin are connected with each other in parallel. The second bridge arm 13 includes a fifth switch M5, a sixth switch M6, a seventh switch M7 and an eighth switch M8, which are sequentially connected in series between the input positive terminal Vin+ and the input negative terminal Vin–. The fifth switch M5 is electrically connected with the input positive terminal Vin+. The eighth switch M8 is electrically connected with the input negative terminal Vin–. Moreover, the eighth switch M8 is a second ground switch. The source terminal of the fifth switch M5 and the drain terminal of the sixth switch M6 are connected with a fourth node D. The source terminal of the sixth switch M6 and the drain terminal of the seventh switch M7 are connected with a fifth node E. The source terminal of the seventh switch M7 and the drain terminal of the eighth switch M8 are connected with a sixth node F. Preferably but not exclusively, the switches M5, M6, M7 and M8 of the second bridge arm 13 are MOSFET switches, SiC switches or GaN switches.

The transformer T includes an input winding Lp, a first output winding Lo1 and a second output winding Lo2. The input winding Lp, the first output winding Lo1 and the second output winding Lo2 are wound around the same first magnetic core assembly. Consequently, the input winding Lp, the first output winding Lo1 and the second output winding Lo2 are magnetically coupled with each other. The winding method of the input winding Lp, the first output winding Lo1 and the second output winding Lo2 will be described later. The input winding Lp, the resonant inductor Lr and the third resonant capacitor Cr3 are serially connected between the second node B and the fifth node E. The first terminal of the input winding Lp is electrically connected with the second node B. The second terminal of the input winding Lp is electrically connected with the first terminal of the resonant inductor Lr. The second terminal of the resonant inductor Lr is electrically connected with the first terminal of the third resonant capacitor Cr3. The second terminal of the third resonant capacitor Cr3 is electrically connected with the fifth node E. It is noted that the connecting sequency of the input winding Lp, the resonant inductor Lr and the third resonant capacitor Cr3 is not restricted. The first output winding Lo1 is electrically connected between the third node C and the output positive terminal Vo+. The second output winding Lo2 is electrically connected between the output positive terminal Vo+ and the sixth node F. Moreover, the first terminal of the first output winding Lo1 and the first terminal of the second output winding Lo2 are electrically connected with the output positive terminal Vo+. The second terminal of the first output winding Lo1 is electrically connected with the third node C.

The second terminal of the second output winding Lo2 is electrically connected with the sixth node F. The first terminal of the first output winding Lo1, the second terminal of the second output winding Lo2 and the first terminal of the input winding Lp are common-polarity terminals (i.e., dotted terminals). In an embodiment, the resonant inductor Lr is formed by the leakage inductor of the input winding Lp, or the resonant inductor Lr is another inductor independent of the input winding Lp.

The first resonant capacitor Cr1 is electrically connected between the first node A and the third node C. The second resonant capacitor Cr2 is electrically connected with the fourth node D and the sixth node F. The output capacitor Co is electrically connected between the output positive terminal Vo+ and the output negative terminal Vo–.

In an embodiment, the first output winding Lo1, the fourth switch M4 (i.e., the first ground switch of the first bridge arm 12) and the output capacitor Co are collaboratively formed as a first closed loop, and the second output winding Lo2, the eighth switch M8 (i.e., the second ground switch of the second bridge arm 13) and the output capacitor Co are collaboratively formed as a second closed loop. In FIG. 2, each electronic component represents a single electronic component or a plurality of electronic components in serial connection. For succinctness, the plurality of electronic components in serial connection are indicated by the same symbol.

In an embodiment, the power conversion module 1 further includes a driving circuit and a control circuit (not shown). For example, as shown in FIGS. 1A, 1B and 1C, the driving circuit includes a driving transformer 6. The driving circuit is electrically connected with the first switch M1, the second switch M2, the third switch M3, the fourth switch M4, the fifth switch M5, the sixth switch M6, the seventh switch M7 and the eighth switch M8. The control circuit is electrically connected with the driving circuit. The control circuit generates a plurality of PWM control signals. According to the plurality of PWM control signals, the driving circuit generates corresponding driving signals to drive the corresponding switches. That is, the on/off states of the switches of the power conversion module 1 are controlled according to the corresponding driving signals. Hereinafter, the waveforms of the signals for controlling the switches will be described to illustrate the operations of the power conversion module 1.

Please refer to FIGS. 2 and 3. In FIG. 3, Vgs1/3/6/8 denote the gate-source voltages of the first switch M1, the third switch M3, the sixth switch M6 and the eighth switch M8, respectively. Moreover, Vgs2/4/5/7 denote the gate-source voltages of the second switch M2, the fourth switch M4, the fifth switch M5 and the seventh switch M7, respectively. Moreover, iLp, iLo1 and iLo2 denote the currents flowing through the input winding Lp, the first output winding Lo1 and the second output winding Lo2, respectively. The current iLp flowing through the input winding Lp contains the magnetized current iLm of the transformer T. In FIG. 3, the current flowing from the second terminal of the input winding Lp to the first terminal (i.e., the dotted terminal) of the input winding Lp is defined as the positive current direction of the input winding Lp, the current flowing from the second terminal of the first output winding Lo1 to the first terminal (i.e., the dotted terminal) of the first output winding Lo1 is defined as the positive current direction of the first output winding Lo1, and the current flowing from the second terminal (i.e., the dotted terminal) of the second output winding Lo2 to the first terminal of the second output winding Lo2 is defined as the positive current direction of the second output winding Lo2.

As shown in FIG. 3, the time interval between the time point t0 and the time point t4 is equal to one switching cycle. The on/off states of the first switch M1, the third switch M3, the sixth switch M6 and the eighth switch M8 are identical. The on/off states of the second switch M2, the fourth switch M4, the fifth switch M5 and the seventh switch M7 are identical. The phase difference between the control signal for controlling the first switch M1, the third switch M3, the sixth switch M6 and the eighth switch M8 and the control signal for controlling the second switch M2, the fourth switch M4, the fifth switch M5 and the seventh switch M7 is 180 degrees. In case that the dead time (e.g., the time interval between the time point t1 and the time point t2 and the time interval between the time point t3 and the time point t4) is ignored, the duty cycle of each of the switches M1, M2, M3, M4, M5, M6, M7 and M8 is 50%. In case that the dead time exists, the duty cycle of each switch is slightly lower than 50%. For convenience of illustration, the duty cycle of each switch is considered as 50%.

In the time interval between the time point t0 and the time point t1, the first switch M1, the third switch M3, the sixth switch M6 and the eighth switch M8 are turned on, and the second switch M2, the fourth switch M4, the fifth switch M5 and the seventh switch M7 are turned off. The magnetized current iLm rises linearly from a negative value. Due to resonance, the current iLp increases to a positive peak value and then decreases to be equal to the magnetized current iLm. The current iLo1 increases from zero to the positive peak value, and then decreases to zero. The current iLo2 increases from zero to the positive peak value, and then decreases to zero. Preferably but not exclusively, the difference between the current iLp and the magnetized current iLm, the current iLo1 and the current iLo2 are in a ratio of 1:2:3.

In FIG. 3, the time interval between the time point t1 and the time point t2 is a dead time. During the dead time, the magnetized current iLm charges and discharges the parasitic capacitors of the corresponding switches, and the drain-source voltages of the switches to be turned on will drop to zero at the end of the dead time. For example, during the dead time between the time point t1 and the time point t2, the magnetized current iLm charges the parasitic capacitors of the first switch M1, the third switch M3, the sixth switch M6 and the eighth switch M8, and the magnetized current iLm discharges the parasitic capacitors of the second switch M2, the fourth switch M4, the fifth switch M5 and the seventh switch M7. Consequently, at the end of the dead time (i.e., at the time point t2) or before the end of the dead time, the drain-source voltages of the second switch M2, the fourth switch M4, the fifth switch M5 and the seventh switch M7 drop to zero. Consequently, the zero voltage switching functions of the second switch M2, the fourth switch M4, the fifth switch M5 and the seventh switch M7 can be achieved, and the switching loss of the second switch M2, the fourth switch M4, the fifth switch M5 and the seventh switch M7 can be reduced.

In the time interval between the time point t2 and the time point t3, the second switch M2, the fourth switch M4, the fifth switch M5 and the seventh switch M7 are turned on, and the first switch M1, the third switch M3, the sixth switch M6 and the eighth switch M8 are turned off. The magnetized current iLm drops linearly from the positive value. Due to resonance, the current iLp decreases to the negative peak value and then increases to be equal to the magnetized current iLm. The current iLo1 increases from zero to the positive peak value, and then decreases to zero. The current iLo2 increases from zero to the positive peak value, and then decreases to zero. Preferably but not exclusively, the difference between the current iLp and the magnetized current iLm, the current iLo1 and the current iLo2 are in a ratio of 1:2:3.

In FIG. 3, the time interval between the time point t3 and the time point t4 is a dead time. During the dead time, the magnetized current iLm charges the parasitic capacitors of the second switch M2, the fourth switch M4, the fifth switch M5 and the seventh switch M7, and the magnetized current iLm discharges the parasitic capacitors of the first switch M1, the third switch M3, the sixth switch M6 and the eighth switch M8. Consequently, at the end of the dead time (i.e., at the time point t4) or before the end of the dead time, the drain-source voltages of the first switch M1, the third switch M3, the sixth switch M6 and the eighth switch M8 drop to zero. Consequently, the zero voltage switching functions of the first switch M1, the third switch M3, the sixth switch M6 and the eighth switch M8 can be achieved, and the switching loss of the first switch M1, the third switch M3, the sixth switch M6 and the eighth switch M8 can be reduced.

As shown in FIGS. 1A, 1B and 1C, the power conversion module 1 is disposed on the system board (not shown). The power conversion 1 includes a circuit board 2, a magnetic device 3, a plurality of switches (i.e., the first switch M1, the second switch M2, the third switch M3, two fourth switches M4, the fifth switch M5, the sixth switch M6, the seventh switch M7 and two eighth switches M8), a plurality of input capacitors Cin, the first resonant capacitor Cr1, the second resonant capacitor Cr2, the third resonant capacitor Cr3 and a plurality of output capacitors Co.

The circuit board 2 includes a first surface 21, a second surface 22, a plurality of lateral surfaces 23, a first accommodation space 24, a second accommodation space (not shown) and two openings 24a. The first surface 21 and the second surface 22 of the circuit board 2 are opposite to each other. The plurality of lateral surfaces 23 are arranged between the first surface 21 and the second surface 22. The first accommodation space 24 is concavely formed in the first surface 21 of the circuit board 2. The second accommodation space is concavely formed in the second surface 22 of the circuit board 2. The first accommodation space 24 and the second accommodation space are opposite to each other. The two openings 24a run through the circuit board 2. Moreover, the two openings 24a are in communication with the first accommodation space 24 and the second accommodation space.

In some other embodiments, the circuit board 2 is equipped with the first accommodation space 24 only. The first accommodation space 24 is concavely formed in the first surface 21 of the circuit board 2. The two openings 24a run through the circuit board 2. Moreover, the two openings 24a are in communication with the first accommodation space 24 and the second surface 22 of the circuit board 2.

The magnetic device 3 is a structure for the transformer T in FIG. 2. The magnetic device 3 includes a first magnetic core assembly 31 and a first winding assembly 32. The first winding assembly 32 is disposed in the circuit board 2. The winding method of the first winding assembly 32 will be described in FIG. 4.

As shown in FIGS. 1A, 1B and 1C, the first magnetic core assembly 31 includes a first lateral side 31a, a second lateral side 31b, a third lateral side 31c, a fourth lateral side 31d, a first magnetic cover 311, a second magnetic cover 312, a first magnetic leg 313, a second magnetic leg 314 and a channel 315.

The first lateral side 31a and the second lateral side 31b are opposite to each other. The third lateral side 31c and the fourth lateral side 31d are opposite to each other. In addition, the third lateral side 31c and the fourth lateral side 31d are arranged between the first lateral side 31a and the second lateral side 31b. The first magnetic cover 311 is disposed on the first surface 21 of the circuit board 2. In addition, a portion of the first magnetic cover 311 is accommodated within the first accommodation space 24. Consequently, the distance between the surface of the first magnetic cover 311 and the first surface 21 of the circuit board 2 is smaller than the thickness of the first magnetic cover 311. The second magnetic cover 312 is disposed on the second surface 22 of the circuit board 2. The first magnetic cover 311 and the second magnetic cover 312 are opposite to each other. In addition, a portion of the second magnetic cover 312 is accommodated within the second accommodation space. Consequently, the distance between the surface of the second magnetic cover 312 and the second surface 22 of the circuit board 2 is smaller than the thickness of the second magnetic cover 312. The first magnetic leg 313 and the second magnetic leg 314 are respectively penetrated through the two openings 24a of the circuit board 2. Moreover, the first magnetic leg 313, the second magnetic leg 314, the first magnetic cover 311 and the second magnetic cover 312 are fixed on the circuit board 2.

The first magnetic leg 313 is connected between the first end of the first magnetic cover 311 and the first end of the second magnetic cover 312. The surface of the first magnetic leg 313 away from the second magnetic leg 314 is the first lateral side 31a of the first magnetic core assembly 31. The first magnetic leg 313 is penetrated through one of the two openings 24a of the circuit board 2.

As shown in FIG. 1C, the first magnetic leg 313 includes two sub-legs. One sub-leg of the first magnetic leg 313 is connected with the first magnetic cover 311. The other sub-leg of the first magnetic leg 313 is connected with the second magnetic cover 312. In another embodiment, the first magnetic leg 313 has an integral leg structure.

The second magnetic leg 314 is connected between the second end of the first magnetic cover 311 and the second end of the second magnetic cover 312. The surface of the second magnetic leg 314 away from the first magnetic leg 313 is the second lateral side 31b of the first magnetic core assembly 31. The second magnetic leg 314 is penetrated through the other of the two openings 24a of the circuit board 2.

As shown in FIG. 1C, the second magnetic leg 314 includes two sub-legs. One sub-leg of the second magnetic leg 314 is connected with the first magnetic cover 311. The other sub-leg of the second magnetic leg 314 is connected with the second magnetic cover 312. In another embodiment, the second magnetic leg 314 has an integral leg structure.

The channel 315 is formed between the first magnetic leg 313 and the second magnetic leg 314. Moreover, the channel 315 is in communication with the third lateral side 31c and the fourth lateral side 31d of the first magnetic core assembly 31.

As shown in FIGS. 1A and 1C, the first switch M1, the second switch M2, the third switch M3, the fifth switch M5, the sixth switch M6 and the seventh switch M7 are disposed on the first surface 21 of the circuit board 2. One of the two fourth switches M4 and one of the two eighth switches M8 are disposed on the first surface 21 of the circuit board 2. The other of the two fourth switches M4 and the other of the two eighth switches M8 are disposed on the second surface 22 of the circuit board 2. The fourth switch M4 disposed on the first surface 21 of the circuit board 2 and the fourth switch M4 disposed on the second surface 22 of the circuit board 2 have projections on the first surface 21 of the circuit board 2 partially or completely overlapped with each other. The eighth switch M8 disposed on the first surface 21 of the circuit board 2 and the eighth switch M8 disposed on the second surface 22 of the circuit board 2 have projections on the first surface 21 of the circuit board 2 partially or completely overlapped with each other.

Please refer to FIG. 1C again. The first switch M1 and the second switch M2 are located beside each other. When the first magnetic core assembly 31 is disposed on the circuit board 2, the first switch M1 and the second switch M2 are located beside the first lateral side 31a of the first magnetic core assembly 31a. The fifth switch M5 and the sixth switch M6 are located beside each other. When the first magnetic core assembly 31 is disposed on the circuit board 2, the fifth switch M5 and the sixth switch M6 are located beside the second lateral side 31b of the first magnetic core assembly 31. The fourth switch M4 and the eighth switch M8 are located beside each other. When the first magnetic core assembly 31 is disposed on the circuit board 2, the fourth switch M4 and the eighth switch M8 are located beside the fourth lateral side 31d of the first magnetic core assembly 31. The third switch M3 is located beside the second switch M2 and the fourth switch M4. The seventh switch M7 is located beside the sixth switch M6 and the eighth switch M8. The first switch M1, the second switch M2 and the third switch M3 are arranged sequentially. The fifth switch M5, the six switch M6 and the seventh switch M7 are arranged sequentially. The third switch M3, the fourth switch M4, the eighth switch M8 and the seventh switch M7 are arranged sequentially. The arrangement direction of the first switch M1, the second switch M2 and the third switch M3 and the arrangement direction of the third switch M3, the fourth switch M4, the eighth switch M8 and the seventh switch M7 are perpendicular to each other. The arrangement direction of the fifth switch M5, the sixth switch M6 and the seventh switch M7 and the arrangement direction of the third switch M3, the fourth switch M4, the eighth switch M8 and the seventh switch M7 are perpendicular to each other. When the first magnetic core assembly 31 is disposed on the circuit board 2, the arrangement direction of the third switch M3, the fourth switch M4, the eighth switch M8 and the seventh switch M7 is in a parallel with the fourth lateral side 31d of the first magnetic core assembly 31. That is, the arrangement direction of the third switch M3, the fourth switch M4, the eighth switch M8 and the seventh switch M7 is perpendicular with the extending direction of the channel 315.

As shown in FIGS. 1A and 1C, the first switch M1, the second switch M2, the third switch M3, the fourth switch M4, the eighth switch M8, the seventh switch M7, the sixth switch M6 and the fifth switch M5 are sequentially arranged around the first lateral side 31a, the fourth lateral side 31d and the second lateral side 31b of the first magnetic core assembly 31. When the first magnetic core assembly 31 is disposed on the circuit board 2, the first switch M1, the second switch M2, the third switch M3 and the fourth switch M4 are symmetric to the fifth switch M5, the sixth switch M6, the seventh switch M7 and the eighth switch M8 with respect to the channel 315.

In an embodiment, the thickness of the first magnetic cover 311 is greater than or equal to the height of each switch with respect to the first surface 21 of the circuit board 2. Since a portion of the first magnetic cover 311 of the first magnetic core assembly 31 is accommodated within the first accommodation space 24 of the circuit board 2, the height of the top surface of the first magnetic cover 311 with respect to the first surface 21 of the circuit board 2 is smaller than the height of each switch (i.e., each of the first switch M1, the second switch M2, the third switch M3, the fourth switch M4, the fifth switch M5, the sixth switch M6, the seventh switch M7 and the eighth switch M8) with respect to the first surface 21 of the circuit board 2. When a heat sink (not shown) is disposed on the first surface 21 of the circuit board 2, the gap between each switch and the heat sink is smaller than the gap between the first magnetic core assembly 31 and the heat sink. Consequently, the thermal resistance between each switch and the heat sink is effectively reduced. Moreover, since the mechanical pressure of the heat sink is difficult to be transmitted to the first magnetic core assembly 31, the reliability of the first magnetic core assembly 31 is enhanced.

The plurality of input capacitors Cin (e.g., four input capacitors Cin) are disposed on the second surface 22 of the circuit board 2. When the first magnetic core assembly 31 is disposed on the circuit board 2, two of the four input capacitors Cin are located beside the first lateral side 31*a* of the first magnetic core assembly 31, and the other two of the input capacitors Cin are located beside the second lateral side 31*b* of the first magnetic core assembly 31.

The first resonant capacitors Cr1 are disposed on the second surface 22 of the circuit board 2. When the first magnetic core assembly 31 is disposed on the circuit board 2, the first resonant capacitors Cr1 are located beside the first lateral side 31*a* of the first magnetic core assembly 31 and the corresponding input capacitors Cin. Moreover, the first resonant capacitors Cr1 and the second switch M2 are opposite to each other with respect to the circuit board 2.

The second resonant capacitors Cr2 are disposed on the second surface 22 of the circuit board 2. When the first magnetic core assembly 31 is disposed on the circuit board 2, the second resonant capacitors Cr2 are located beside the second lateral side 31*b* of the first magnetic core assembly 31 and the corresponding input capacitors Cin. Moreover, the second resonant capacitors Cr2 and the sixth switch M6 are opposite to each other with respect to the circuit board 2.

In this embodiment, the third resonant capacitor Cr3 includes a plurality of sub-resonant capacitors. Some sub-resonant capacitors of the third resonant capacitor Cr3 are disposed on the first surface 21 of the circuit board 2. The other sub-resonant capacitors of the third resonant capacitor Cr3 are disposed on the second surface 22 of the circuit board 2. Moreover, when the first magnetic core assembly 31 is disposed on the circuit board 2, the sub-resonant capacitors of the third resonant capacitor Cr3 are located beside the third lateral side 31*c* of the first magnetic core assembly 31 and a first end of the channel 315 of the first magnetic core assembly 31.

Some of the plurality of output capacitors Co are disposed on the first surface 21 of the circuit board 2. The other of the plurality of output capacitors Co are disposed on the second surface 22 of the circuit board 2. In addition, these output capacitors Co are located beside the corresponding fourth switches M4 and the corresponding eighth switches M8. Moreover, the fourth switches M4 and the eighth switches M8 are arranged between the output capacitors Co and the fourth lateral side 31*d* of the first magnetic core assembly 31.

Please refer to FIG. 1B again. The power conversion module 1 further includes two positive output pads 41, two negative output pads 42 and four positive input pads 43.

The two positive output pads 41 are used as the output positive terminals Vo+ as shown in FIG. 2. The two positive output pads 41 are disposed on the second surface 22 of the circuit board 2. When the first magnetic core assembly 31 is disposed on the circuit board 2, one of the two positive output pads 41 is located near the junction between the second lateral side 31*b* and the fourth lateral side 31*d* of the first magnetic core assembly 31, and the other of the two positive output pads 41 is located near the junction between the first lateral side 31*a* and the fourth lateral side 31*d* of the first magnetic core assembly 31.

The two negative output pads 42 are used as the output negative terminals Vo− as shown in FIG. 2. The two negative output pads 42 are disposed on the second surface 22 of the circuit board 2. When the first magnetic core assembly 31 is disposed on the circuit board 2, one of the two negative output pads 42 is located near the junction between the second lateral side 31*b* and the fourth lateral side 31*d* of the first magnetic core assembly 31, and the other of the two negative output pads 42 is located near the junction between the first lateral side 31*a* and the fourth lateral side 31*d* of the first magnetic core assembly 31. Moreover, one positive output pad 41 is arranged between the second resonant capacitors Cr2 and the corresponding negative output pad 42, and the other positive output pad 41 is arranged between the first resonant capacitors Cr1 and the corresponding negative output pad 42.

Two of the four positive input pads 43 are used as the input positive terminals Vin+ as shown in FIG. 2 and disposed on the second surface 22 of the circuit board 2. When the first magnetic core assembly 31 is disposed on the circuit board 2, one of the two positive input pads 43 is located beside the first lateral side 31*a* of the first magnetic core assembly 31, and the other of the two positive output pads 43 is located beside the second lateral side 31*b* of the first magnetic core assembly 31. Moreover, the other two of the four positive input pads 43 are used as the input positive terminals Vin+ as shown in FIG. 2 and disposed on the first surface 21 of the circuit board 2. Moreover, the two positive input pads 43 on the first surface 21 of the circuit board 2 and the two positive input pads 43 on the second surface 22 of the circuit board 2 are respectively aligned with each other.

In this embodiment, one negative input pad 42, one positive output pad 41, the second resonant capacitors Cr2, the corresponding input capacitors Cin and one positive input pad 43 are arranged sequentially, and the other negative input pad 42, the other positive output pad 41, the first resonant capacitors Cr1, the corresponding input capacitors Cin and the other positive input pad 43 are arranged sequentially. In this embodiment, the positive output pads 41 are electrically connected with the corresponding electric traces in the circuit board 2 through the corresponding lateral electroplated structures. Similarly, the negative output pads 42 are electrically connected with the corresponding electric traces in the circuit board 2 through the corresponding lateral electroplated structures. Moreover, the two positive input pads 43 on the first surface 21 of the circuit board 2 and the corresponding positive input pads 43 on the second surface 22 of the circuit board 2 are electrically connected with each other through the corresponding lateral electroplated structures. In addition, the two positive input pads 43 on the first surface 21 of the circuit board 2 and the corresponding positive input pads 43 on the second surface 22 of the circuit board 2 are electrically connected with the corresponding electric traces in the circuit board 2 through the corresponding lateral electroplated structures.

The method of winding the first winding assembly 32 around the first magnetic core assembly 31 will be described with reference to FIG. 4. For succinctness, the first magnetic cover 311 of the first magnetic core assembly 31 is not shown. That is, only the second magnetic cover 312 is shown in FIG. 4. The positions of the fourth switch M4, the eighth switch M8, the output capacitor Co and the third resonant capacitor Cr3 relative to the first magnetic core assembly 31 are also shown in FIG. 4 in order to describe the connection relationships between these components and the flowing directions of the currents. The fourth switch M4, the eighth switch M8, the output capacitor Co are located beside the fourth lateral side 31d of the first magnetic core assembly 31. The third resonant capacitor Cr3 is located beside the third lateral side 31c of the first magnetic core assembly 31. In this embodiment, the third resonant capacitor Cr3 includes a plurality of sub-resonant capacitors. For example, the third resonant capacitor Cr3 includes a sub-resonant capacitor Cr31 and a second sub-resonant capacitor Cr32.

As shown in FIG. 4, the first winding assembly 32 includes a first output winding Lo1, a second output winding Lo2 and an input winding Lp. The first output winding Lo1 and the second output winding Lo2 are coupled windings. The first output inductor Lo1 includes a first sub-winding 511, a second sub-winding 512, a third sub-winding 513. The first terminal of the first sub-winding 511 of the first output winding Lo1 is located beside the fourth lateral side 31d of the first magnetic core assembly 31. In addition, the first terminal of the first sub-winding 511 of the first output winding Lo1 is electrically connected with the output capacitor Co. The second terminal of the first sub-winding 511 of the first output winding Lo1 is located beside the third lateral side 31c of the first magnetic core assembly 31. Moreover, the first output winding Lo1 goes through the channel 315. The first terminal of the second sub-winding 512 of the first output winding Lo1 is connected with the second terminal of the first sub-winding 511 of the first output winding Lo1. In addition, the first terminal of the second sub-winding 512 of the first output winding Lo1 is located beside the third lateral side 31c of the first magnetic core assembly 31. The second terminal of the second sub-winding 512 of the first output winding Lo1 is located beside the fourth lateral side 31d of the first magnetic core assembly 31. A portion of the second sub-winding 512 of the first output winding Lo1 is further located beside the first lateral side 31a of the first magnetic core assembly 31. Consequently, the second sub-winding 512 of the first output winding Lo1 is wound around the first magnetic leg 313. The first terminal of the third sub-winding 513 of the first output winding Lo1 is connected with the second terminal of the first sub-winding 511 of the first output winding Lo1. In addition, the first terminal of the third sub-winding 513 of the first output winding Lo1 is located beside the third lateral side 31c of the first magnetic core assembly 31. The second terminal of the third sub-winding 513 of the first output winding Lo1 is located beside the fourth lateral side 31d of the first magnetic core assembly 31. A portion of the third sub-winding 513 of the first output winding Lo1 is further located beside the second lateral side 31b of the first magnetic core assembly 31. Consequently, the third sub-winding 513 of the first output winding Lo1 is wound around the second magnetic leg 314. The second terminal of the third sub-winding 513 of the first output winding Lo1 is further connected with the second terminal of the second sub-winding 512. In addition, the second terminal of the third sub-winding 513 of the first output winding Lo1 is electrically connected with the drain terminal of the fourth switch M4.

The currents flow through the first output winding Lo1 along two branches. In the first branch, the current flows from the second terminal to the first terminal of the second sub-winding 512 of the first output winding Lo1 and flows from the second terminal to the first terminal of the first sub-winding 511 of the first output winding Lo1. In the second branch, the current flows from the second terminal to the first terminal of the third sub-winding 513 of the first output winding Lo1 and flows from the second terminal to the first terminal of the first sub-winding 511 of the first output winding Lo1.

The second output winding Lo2 includes a first sub-winding 521, a second sub-winding 522 and a third sub-winding 523. The first terminal of the first sub-winding 521 of the second output winding Lo2 is located beside the fourth lateral side 31d of the first magnetic core assembly 31. In addition, the first terminal of the first sub-winding 521 of the second output winding Lo2 is electrically connected with the drain terminal of the eighth switch M8. The second terminal of the first sub-winding 521 of the second output winding Lo2 is located beside the third lateral side 31c of the first magnetic core assembly 31. Moreover, the second output winding Lo2 goes through the channel 315. The first terminal of the second sub-winding 522 of the second output winding Lo2 is connected with the second terminal of the first sub-winding 521 of the second output winding Lo2. In addition, and the first terminal of the second sub-winding 522 of the second output winding Lo2 is located beside the third lateral side 31c of the first magnetic core assembly 31. The second terminal of the second sub-winding 522 of the second output winding Lo2 is located beside the fourth lateral side 31d of the first magnetic core assembly 31. A portion of the second sub-winding 522 of the second output winding Lo2 is further located beside the first lateral side 31a of the first magnetic core assembly 31. Consequently, the second sub-winding 522 of the second output winding Lo2 is wound around the first magnetic leg 313. The first terminal of the third sub-winding 523 of the second output winding Lo2 is connected with the second terminal of the first sub-winding 521 of the second output winding Lo2. In addition, the first terminal of the third sub-winding 523 of the second output winding Lo2 is located beside the third lateral side 31c of the first magnetic core assembly 31. The second terminal of the third sub-winding 523 of the second output winding Lo2 is located beside the fourth lateral side 31d of the first magnetic core assembly 31. A portion of the third sub-winding 523 of the second output winding Lo2 is further located beside the second lateral side 31b of the first magnetic core assembly 31. Consequently, the third sub-winding 523 of the second output winding Lo2 is wound around the second magnetic leg 314. The second terminal of the third sub-winding 523 of the second output winding Lo2 is further connected with the second terminal of the second sub-winding 522. In addition, the second terminal of the third sub-winding 523 of the second output winding Lo2 is electrically connected with the output capacitor Co.

The currents flow through the second output winding Lo2 along two branches. In the first branch, the current flows from the first terminal to the second terminal of the first sub-winding 521 of the second output winding Lo2 and flows from the first terminal to the second terminal of the second sub-winding 522 of the second output winding Lo2. In the second branch, the current flows from the first terminal to the second terminal of the first sub-winding 521 of the second output winding Lo2 and flows from the first terminal to the second terminal of the third sub-winding 522 of the second output winding Lo2.

As mentioned above, the winding direction of the first output winding Lo1 around the first magnetic leg 313 and the winding direction of the first output winding Lo1 around the second magnetic leg 314 are opposite to each other, and the winding direction of the second output winding Lo2 around the first magnetic leg 313 and the winding direction of the second output winding Lo2 around the second magnetic leg 314 are opposite to each other. In addition, the winding direction of the second output winding Lo2 around the first magnetic leg 313 and the winding direction of the first output winding Lo1 around the first magnetic leg 313 are opposite to each other, and the winding direction of the second output winding Lo2 around the second magnetic leg 314 and the winding direction of the first output winding Lo1 around the second magnetic leg 314 are opposite to each other. Consequently, the direction of the DC magnetic flux of the first output winding Lo1 generated through the first magnetic leg 313 and the direction of the DC magnetic flux of the second output winding Lo2 generated through the first magnetic leg 313 are opposite to each other, and the direction of the DC magnetic flux of the first output winding Lo1 generated through the second magnetic leg 314 and the direction of the DC magnetic flux of the second output winding Lo2 generated through the second magnetic leg 314 are opposite to each other.

The first output winding Lo1 has a first projection region on a reference surface (e.g., the first surface 21 of the circuit board 2), and the second output winding Lo2 has a second projection region on the reference surface (e.g., the first surface 21 of the circuit board 2). In an embodiment, the first projection region and the second projection region are partially overlapped with each other. For example, the length of the overlap region between the first projection region and the second projection region is greater than or equal to 60% of the length of the first output winding Lo1. Preferably, the length of the overlap region between the first projection region and the second projection region is greater than or equal to 80% of the length of the first output winding Lo1. In other words, the first output winding Lo1 and the second output winding Lo2 are stacked and overlapped over each other.

In an embodiment, the first output winding Lo1 is formed by a plurality of layers in the circuit board 2, and the second output winding Lo2 is formed by a plurality of layers in the circuit board 2. For example, the first output winding Lo1 is formed by three layers that are stacked, and the second output winding Lo2 is formed by three layers that are stacked. Moreover, at least one layer forming the first output winding Lo1 is arranged between at least two layers forming the second output winding Lo2, and at least one layer forming the second output winding Lo2 is arranged between at least two layers forming the first output winding Lo1. For example, in an embodiment, a first layer forming the first output winding Lo1, a first layer forming the second output winding Lo2, a second layer forming the first output winding Lo1, a second layer forming the second output winding Lo2, a third layer forming the first output winding Lo1 and a third layer forming the second output winding Lo2 are sequentially stacked and collaboratively formed as a six-layered winding structure. In another embodiment, a first layer forming the first output winding Lo1, a second layer forming the first output winding Lo1, a first layer forming the second output winding Lo2, a second layer forming the second output winding Lo2, a third layer forming the first output winding Lo1 and a third layer forming the second output winding Lo2 are sequentially stacked and collaboratively formed as a six-layered winding structure. It is noted that the layer numbers and the stacking methods forming the first output winding Lo1 and the second output winding Lo2 are not restricted. Due to the winding methods of the first output winding Lo1 and the second output winding Lo2, the coupling coefficient of the first output winding Lo1 and the second output winding Lo2 will be largely increased, the leakage inductance of the first output winding Lo1 and the second output winding Lo2 will be reduced, and the DC/AC loss of the first output winding Lo1 and the second output winding Lo2 will be largely reduced. In the above embodiments, the third layer forming the first output winding Lo1 and the third layer forming the second output winding Lo2 are different layers in the circuit board 2.

The first terminal of the input winding Lp is located beside the fourth lateral side 31d of the first magnetic core assembly 31. The first terminal of the input winding Lp is electrically connected with the second node B. That is, the first terminal of the input winding Lp is electrically connected with the second switch M2 and the third switch M3 as shown in FIG. 2. For succinctness, the second switch M2 and the third switch M3 are not shown in FIG. 4. The second terminal of the input winding Lp is located beside the third lateral side 31c of the first magnetic core assembly 31. The second terminal of the input winding Lp is electrically connected with the first terminal of the first sub-resonant capacitor Cr31 and the first terminal of the second sub-resonant capacitor Cr32. Moreover, the input winding Lp goes through the channel 315.

The circuit board 2 further includes a first trace 251 and a second trace 252. The first terminal of the first trace 251 is located beside the third lateral side 31c of the first magnetic core assembly 31. In addition, the first terminal of the first trace 251 is electrically connected with the second terminal of the first sub-resonant capacitor Cr31. The second terminal of the first trace 251 is located beside the fourth lateral side 31d of the first magnetic core assembly 31. In addition, the second terminal of the first trace 251 is electrically connected with the fifth node E. That is, the second terminal of the first trace 251 is electrically connected with the sixth switch M6 and the seventh switch M7 as shown in FIG. 2. For succinctness, the sixth switch M6 and the seventh switch M7 are not shown in FIG. 4. A portion of the first trace 251 is located beside the first lateral side 31a of the first magnetic core assembly 31. Consequently, the first trace 251 is wound around the first magnetic leg 313. The first terminal of the second trace 252 is located beside the third lateral side 31c of the first magnetic core assembly 31. In addition, the first terminal of the second trace 252 is electrically connected with the second terminal of the second sub-resonant capacitor Cr32. The second terminal of the second trace 252 is located beside the fourth lateral side 31d of the first magnetic core assembly 31. In addition, the second terminal of the first trace 251 is electrically connected with the fifth node E. That is, the second terminal of the second trace 252 is electrically connected with the sixth switch M6 and the seventh switch M7 as shown in FIG. 2. In other words, the second terminal of the second trace 252 is electrically connected with the second terminal of the first trace 251. A portion of the second trace 252 is located beside the second lateral side 31b of the first magnetic core assembly 31. Consequently, the second trace 252 is wound around the second magnetic leg 314.

In an embodiment, the input winding Lp, the first trace 251 and the second trace 252 are collaboratively formed as a current loop. The current loop includes two branches. In the first branch, the current flows from the first terminal to the second terminal of the input winding Lp, flows through the first sub-resonant capacitor Cr31, and then flows from the first terminal to the second terminal of the first trace 251. In the second branch, the current flows from the first terminal to the second terminal of the input winding Lp, flows through the second sub-resonant capacitor Cr32, and then flows from the first terminal to the second terminal of the second trace 252.

The input winding Lp, the first trace 251 and the second trace 252 have a third projection region on the reference surface (e.g., the first surface 21 of the circuit board 2). In an embodiment, the third projection region is partially overlapped with the first projection region and the second projection region. For example, the length of the overlap region between the third projection region and the first projection region is greater than or equal to 60% of the length of the first output winding Lo1. Preferably, the length of the overlap region between the third projection region and the first projection region is greater than or equal to 80% of the length of the first output winding Lo1. In other words, the current loop formed by the input winding Lp, the first trace 251 and the second trace 252 is stacked and overlapped with the first output winding Lo1 and the second output winding Lo2.

In an embodiment, the turn number of the first output winding Lo1, the turn number of the second output winding Lo2 and the turn number of the current loop (i.e., the current loop of the input winding Lp, the first trace 251 and the second trace 252) are in a ratio of 1:1:1. Consequently, the current flowing through the first output winding Lo1, the current flowing through the second output winding Lo2 and the current flowing through the current loop are in the ratio of 2:3:1 or 3:2:1. The layer number forming the first output winding Lo1, the layer number forming the second output winding Lo2 and the layer number forming the current loop are in a ratio of 3:3:1. In an embodiment, the first output winding Lo1 is formed by three layers, the second output winding Lo2 is formed by three layers, and the current loop including the input winding Lp, the first trace 251 and the second trace 252 is formed by a single layer. Preferably, the layer forming the current loop is arranged between any two of the three layers forming the first output winding Lo1 and the three layers forming the second output winding Lo2.

Due to the winding methods of the first output winding Lo1 the second output winding Lo2 and the current loop, the coupling coefficient of the first output winding Lo1, the second output winding Lo2 and the current loop will be largely increased, the leakage inductance of the first output winding Lo1, the second output winding Lo2 and the current loop will be reduced, and the DC/AC loss of the first output winding Lo1, the second output winding Lo2 and the current loop will be largely reduced.

It is noted that the number of the switches in the power conversion module is not restricted.

Figure 5:
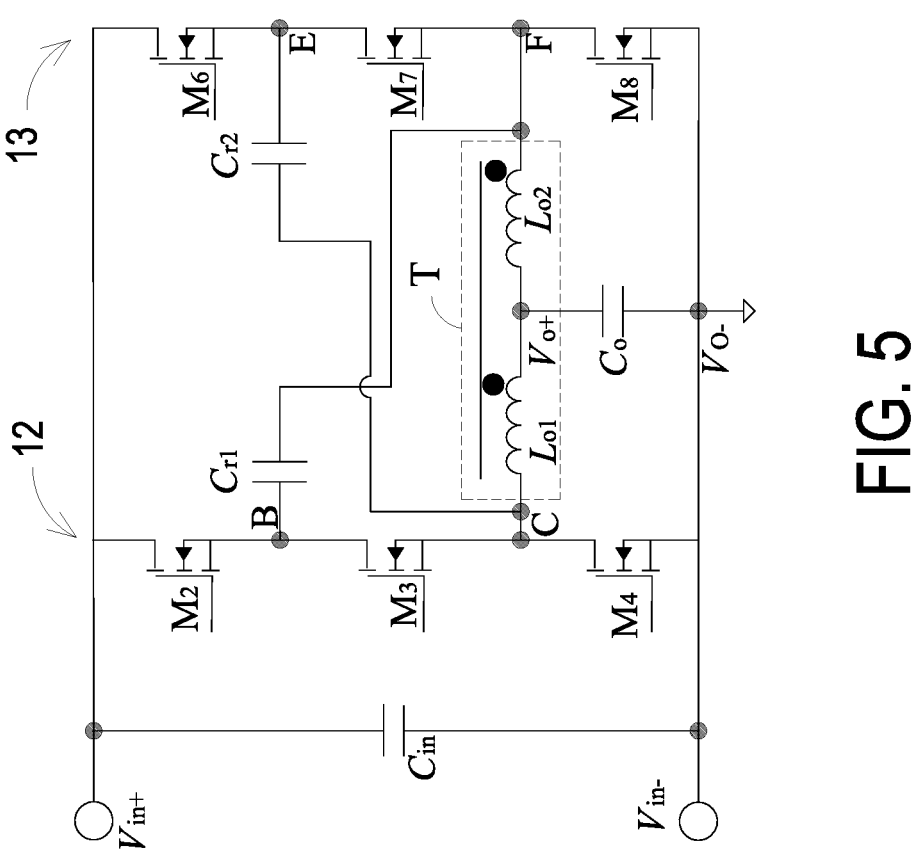
FIG. 5 is a schematic circuit diagram illustrating the circuitry topology of a power conversion module according to a second embodiment of the present disclosure.
Figure 6:
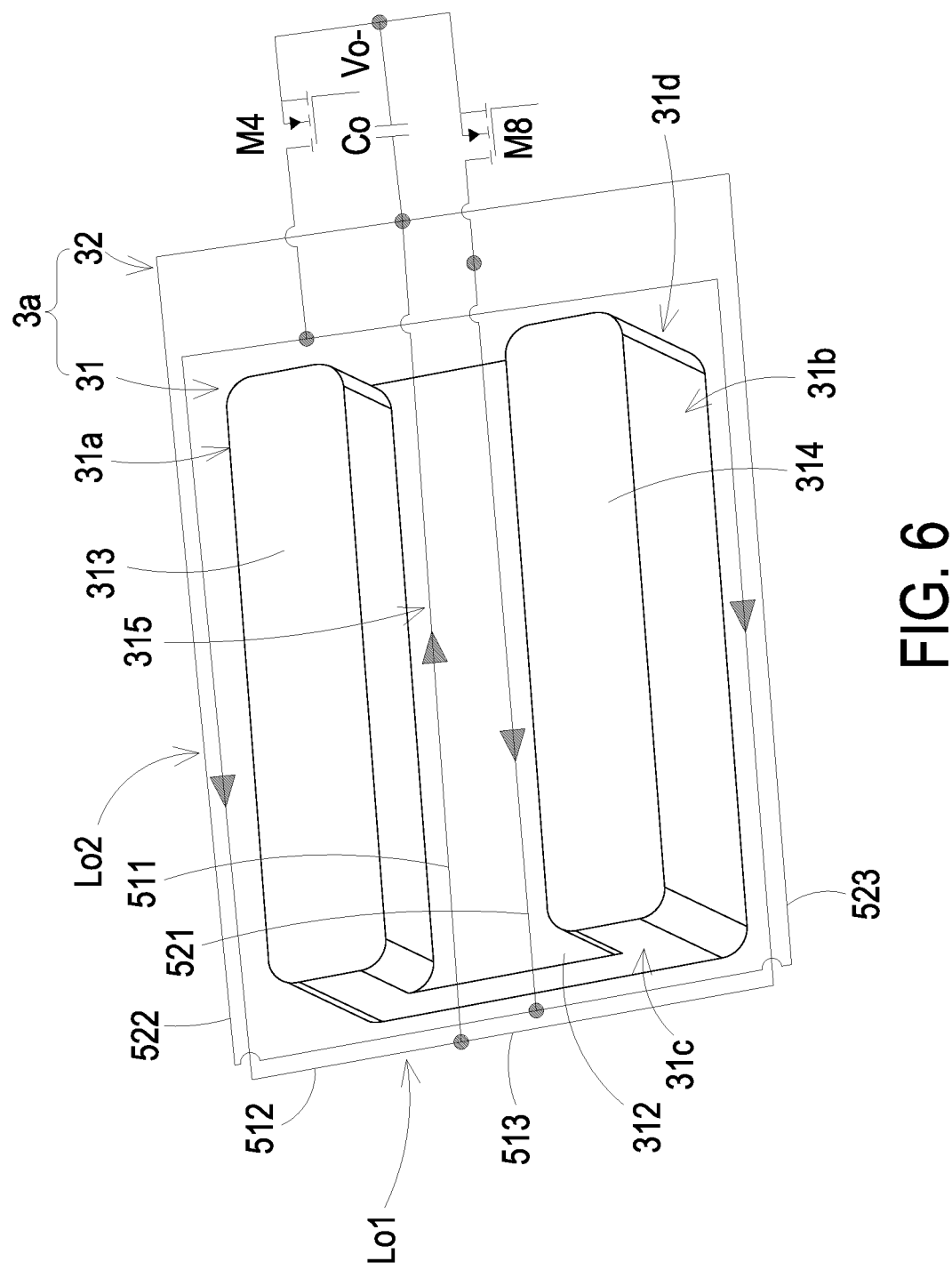
FIG. 6 schematically illustrates the first magnetic core assembly and the first winding assembly of the power conversion module as shown in FIG. 5, in which the first magnetic cover is not shown.

Please refer to FIGS. 5 and 6. FIG. 5 is a schematic circuit diagram illustrating the circuitry topology of a power conversion module according to a second embodiment of the present disclosure. FIG. 6 schematically illustrates the first magnetic core assembly and the first winding assembly of the power conversion module as shown in FIG. 5, in which the first magnetic cover is not shown. As shown in FIG. 5, the power conversion module 1a of this embodiment is a switching-capacitor resonant buck circuit. Moreover, the power conversion module 1a includes an input positive terminal Vin+, an input negative terminal Vin−, an output positive terminal Vo+, an output negative terminal Vo−, an input capacitor Cin, a first bridge arm 12, a second bridge arm 13, a transformer T, a first resonant capacitor Cr1, a second resonant capacitor Cr2 and an output capacitor Co.

The first bridge arm 12 of the power conversion module 1 as shown in FIG. 2 includes four switches. The first bridge arm 12 of the power conversion module 1a of this embodiment includes three switches. As shown in FIG. 5, the first bridge arm 12 of the power conversion module 1a includes a second switch M2, a third switch M3 and a fourth switch M4. The second switch M2 and the fourth switch M4 are electrically connected with the input positive terminal Vin+ and the input negative terminal Vin−, respectively. The source terminal of the second switch M2 and the drain terminal of the third switch M3 are electrically connected with a second node B. The source terminal of the third switch M3 and the drain terminal of the fourth switch M4 are connected with a third node C.

The second bridge arm 13 of the power conversion module 1 as shown in FIG. 2 includes four switches. The power conversion module 1a of this embodiment includes three switches. As shown in FIG. 5, the second bridge arm 13 of the power conversion module 1a includes a sixth switch M6, a seventh switch M7 and an eighth switch M8. The sixth switch M6 and the eighth switch M8 are electrically connected with the input positive terminal Vin+ and the input negative terminal Vin−, respectively. The source terminal of the sixth switch M6 and the drain terminal of the seventh switch M7 are connected with a fifth node E. The source terminal of the seventh switch M7 and the drain terminal of the eighth switch M8 are connected with a sixth node F.

In this embodiment, the transformer T includes a first output winding Lo1 and a second output winding Lo2 only. The connection relationship between the first output winding Lo1 and the second output winding Lo2 of this embodiment is similar to the connection relationship between the first output winding Lo1 and the second output winding Lo2 as shown in FIG. 2, and not redundantly described herein.

In this embodiment, the first resonant capacitor Cr1 is electrically connected between the second node B and the sixth node F. In addition, the second resonant capacitor Cr2 is electrically connected between the third node C and the fifth node E.

As shown in FIG. 6, the magnetic device 3a of this embodiment is a structure for the transformer T as shown in FIG. 5. The magnetic device 3a includes a first magnetic core assembly 31 and a first winding assembly 32. The first winding assembly 32 includes a first output winding Lo1 and the second output winding Lo2. The first output winding Lo1 includes a first sub-winding 511, a second sub-winding 512 and a third sub-winding 513. The first terminal of the first sub-winding 511 of the first output winding Lo1 is located beside the fourth side 31d of the first magnetic core assembly 31. In addition, and the first terminal of the first sub-winding 511 of the first output winding Lo1 is electrically connected with the output capacitor Co. The second terminal of the first sub-winding 511 of the first output winding Lo1 is located beside the third lateral side 31c of the first magnetic core assembly 31. Moreover, the first output winding Lo1 goes through the channel 315. The first terminal of the second sub-winding 512 of the first output winding Lo1 is electrically connected with the second terminal of the first sub-winding 511 of the first output winding Lo1. In addition, and the first terminal of the second sub-winding 512 of the first output winding Lo1 is located beside the third lateral side 31c of the first magnetic core assembly 31. The second terminal of the second sub-winding 512 of the first output winding Lo1 is located beside the fourth lateral side 31*d* of the first magnetic core assembly 31. A portion of the second sub-winding 512 of the first output winding Lo1 is further located beside the first lateral side 31*a* of the first magnetic core assembly 31. Consequently, the second sub-winding 512 of the first output winding Lo1 is wound around the first magnetic leg 313. The first terminal of the third sub-winding 513 of the first output winding Lo1 is connected with the second terminal of the first sub-winding 511 of the first output winding Lo1. In addition, and the first terminal of the third sub-winding 513 of the first output winding Lo1 is located beside the third lateral side 31*c* of the first magnetic core assembly 31. The second terminal of the third sub-winding 513 of the first output winding Lo1 is located beside the fourth lateral side 31*d* of the first magnetic core assembly 31. A portion third sub-winding 513 of the first output winding Lo1 is further located beside the second lateral side 31*b* of the first magnetic core assembly 31. Consequently, the third sub-winding 513 of the first output winding Lo1 is wound around the second magnetic leg 314. The second terminal of the third sub-winding 513 of the first output winding Lo1 is further connected with the second terminal of the second sub-winding 512. In addition, the second terminal of the third sub-winding 513 of the first output winding Lo1 is electrically connected with the drain terminal of the fourth switch M4.

The currents flow through the first output winding Lo1 along two branches. In the first branch, the current flows from the second terminal to the first terminal of the second sub-winding 512 of the first output winding Lo1 and flows from the second terminal to the first terminal of the first sub-winding 511 of the first output winding Lo1. In the second branch, the current flows from the second terminal to the first terminal of the third sub-winding 513 of the first output winding Lo1 and flows from the second terminal to the first terminal of the first sub-winding 511 of the first output winding Lo1.

The second output winding Lo2 includes a first sub-winding 521, a second sub-winding 522 and a third sub-winding 523. The first terminal of the first sub-winding 521 of the second output winding Lo2 is located beside the fourth lateral side 31*d* of the first magnetic core assembly 31. In addition, the first terminal of the first sub-winding 521 of the second output winding Lo2 is electrically connected with the drain terminal of the eighth switch M8. The second terminal of the first sub-winding 521 of the second output winding Lo2 is located beside the third lateral side 31*c* of the first magnetic core assembly 31. Moreover, the second output winding Lo2 goes through the channel 315. The first terminal of the second sub-winding 522 of the second output winding Lo2 is connected with the second terminal of the first sub-winding 521 of the second output winding Lo2. In addition, the first terminal of the second sub-winding 522 of the second output winding Lo2 is located beside the third lateral side 31*c* of the first magnetic core assembly 31. The second terminal of the second sub-winding 522 of the second output winding Lo2 is located beside the fourth lateral side 31*d* of the first magnetic core assembly 31. A portion of the second sub-winding 522 of the second output winding Lo2 is further located beside the first lateral side 31*a* of the first magnetic core assembly 31. Consequently, the second sub-winding 522 of the second output winding Lo2 is wound around the first magnetic leg 313. The first terminal of the third sub-winding 523 of the second output winding Lo2 is connected with the second terminal of the first sub-winding 521 of the second output winding Lo2. In addition, the first terminal of the third sub-winding 523 of the second output winding Lo2 is located beside the third lateral side 31*c* of the first magnetic core assembly 31. The second terminal of the third sub-winding 523 of the second output winding Lo2 is located beside the fourth lateral side 31*d* of the first magnetic core assembly 31. A portion of the third sub-winding 523 of the second output winding Lo2 is further located beside the second lateral side 31*b* of the first magnetic core assembly 31. Consequently, the third sub-winding 523 of the second output winding Lo2 is wound around the second magnetic leg 314. The second terminal of the third sub-winding 523 of the second output winding Lo2 is further connected with the second terminal of the second sub-winding 522. In addition, the second terminal of the third sub-winding 523 of the second output winding Lo2 is electrically connected with the output capacitor Co.

The currents flow through the second output winding Lo2 along two branches. In the first branch, the current flows from the first terminal to the second terminal of the first sub-winding 521 of the second output winding Lo2 and flows from the first terminal to the second terminal of the second sub-winding 522 of the second output winding Lo2. In the second branch, the current flows from the first terminal to the second terminal of the first sub-winding 521 of the second output winding Lo2 and flows from the first terminal to the second terminal of the third sub-winding 522 of the second output winding Lo2.

The first output winding Lo1 has a first projection region on a reference surface (e.g., the first surface 21 of the circuit board 2), and the second output winding Lo2 has a second projection region on the reference surface (e.g., the first surface 21 of the circuit board 2). In an embodiment, the first projection region and the second projection region are partially overlapped with each other. For example, the length of the overlap region between the first projection region and the second projection region is greater than or equal to 60% of the length of the first output winding Lo1. Preferably, the length of the overlap region between the first projection region and the second projection region is greater than or equal to 80% of the length of the first output winding Lo1. In other words, the first output winding Lo1 and the second output winding Lo2 are stacked and overlapped over each other. Due to the winding methods of the first output winding Lo1 and the second output winding Lo2, the coupling coefficient of the first output winding Lo1 and the second output winding Lo2 will be largely increased, the leakage inductance of the first output winding Lo1 and the second output winding Lo2 will be reduced, and the DC/AC loss of the first output winding Lo1 and the second output winding Lo2 will be largely reduced.

Figure 7:
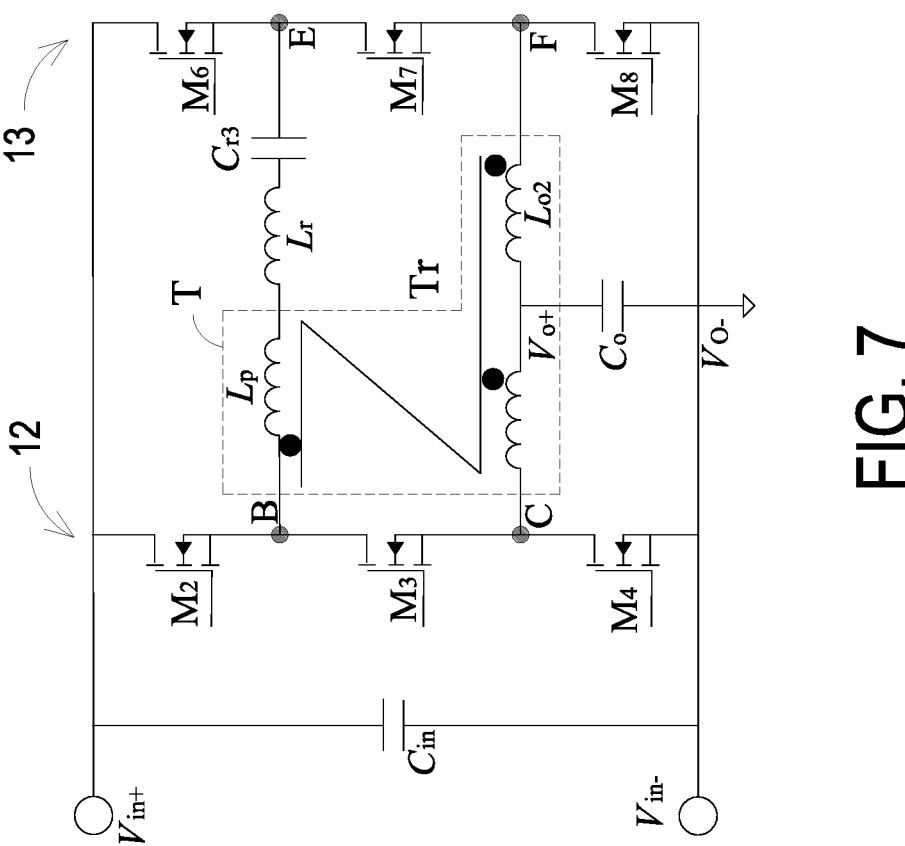
FIG. 7 is a schematic circuit diagram illustrating the circuitry topology of a power conversion module according to a third embodiment of the present disclosure.

FIG. 7 is a schematic circuit diagram illustrating the circuitry topology of a power conversion module according to a third embodiment of the present disclosure. In the power conversion module 1 of FIG. 2, each of the first bridge arm 12 and the second bridge arm 13 includes four switches. In the power conversion module 1*b* of this embodiment, each of the first bridge arm 12 and the second bridge arm 13 includes three switches. The first bridge arm 12 includes a second switch M2, a third switch M3 and a fourth switch M4. The second switch M2 and the fourth switch M4 are electrically connected with the input positive terminal Vin+ and the input negative terminal Vin−, respectively. The source terminal of the second switch M2 and the drain terminal of the third switch M3 are connected with a second node B. The source terminal of the third switch M3 and the drain terminal of the fourth switch M4 are connected with a third node C. The second bridge arm 13 includes a sixth switch M6, a seventh switch M7 and an eighth switch M8. The sixth switch M6 and the eighth switch M8 are electrically connected with the input positive terminal Vin+ and input negative terminal Vin−, respectively. The source terminal of the sixth switch M6 and the drain terminal of the seventh switch M7 are connected with a fifth node E. The source terminal of the seventh switch M7 and the drain terminal of the eighth switch M8 are connected with a sixth node F.

The power conversion module as shown in FIG. 2 includes three resonant capacitors. The power conversion module 1b of this embodiment includes a single resonant capacitor only. As shown in FIG. 7, the power conversion module 1b includes a third resonant capacitor Cr3 only. The position of the third resonant capacitor Cr3 is similar to the position of the third resonant capacitor Cr3 as shown in FIG. 2, and not redundantly described herein.

Figure 8:
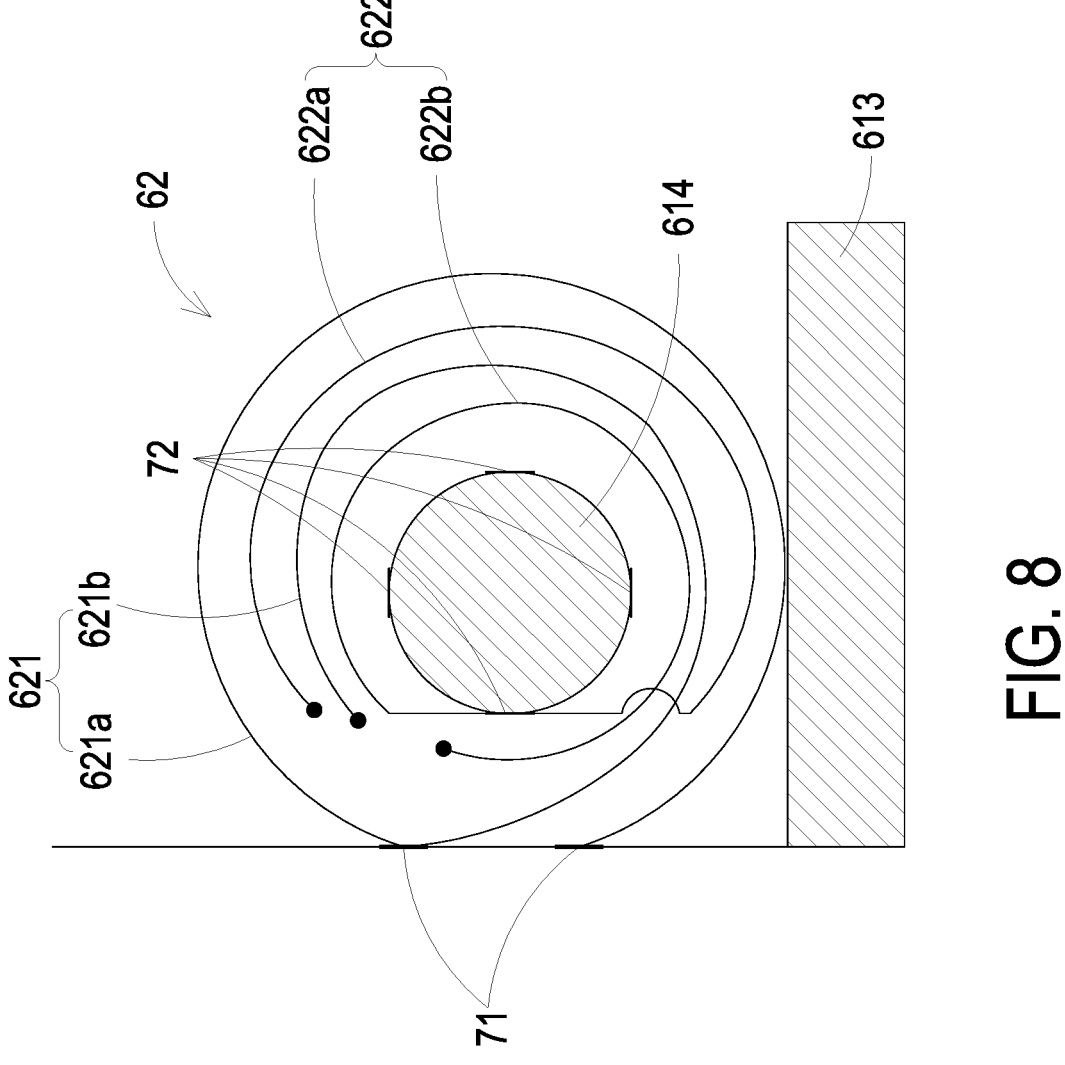
FIG. 8 is a schematic cross-sectional view illustrating a portion of a driving transformer and a portion of the circuit board in the power conversion module as shown in FIG. 1C.
Figure 9A:
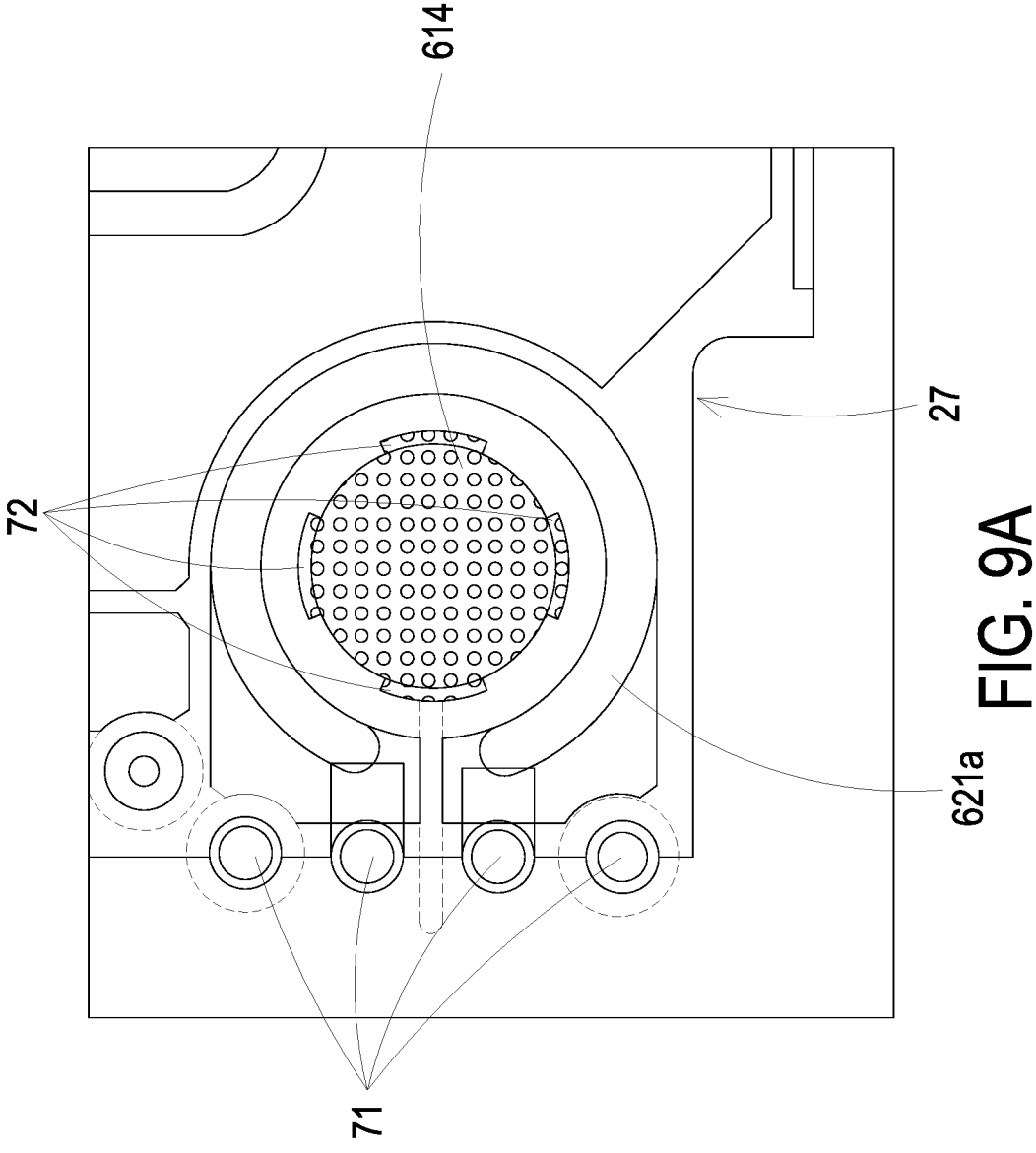
FIGS. 9A and 9B are schematic cross-sectional views illustrating the driving transformer and the primary winding of the driving transformer in the power conversion module as shown in FIG. 1C.
Figure 9B:
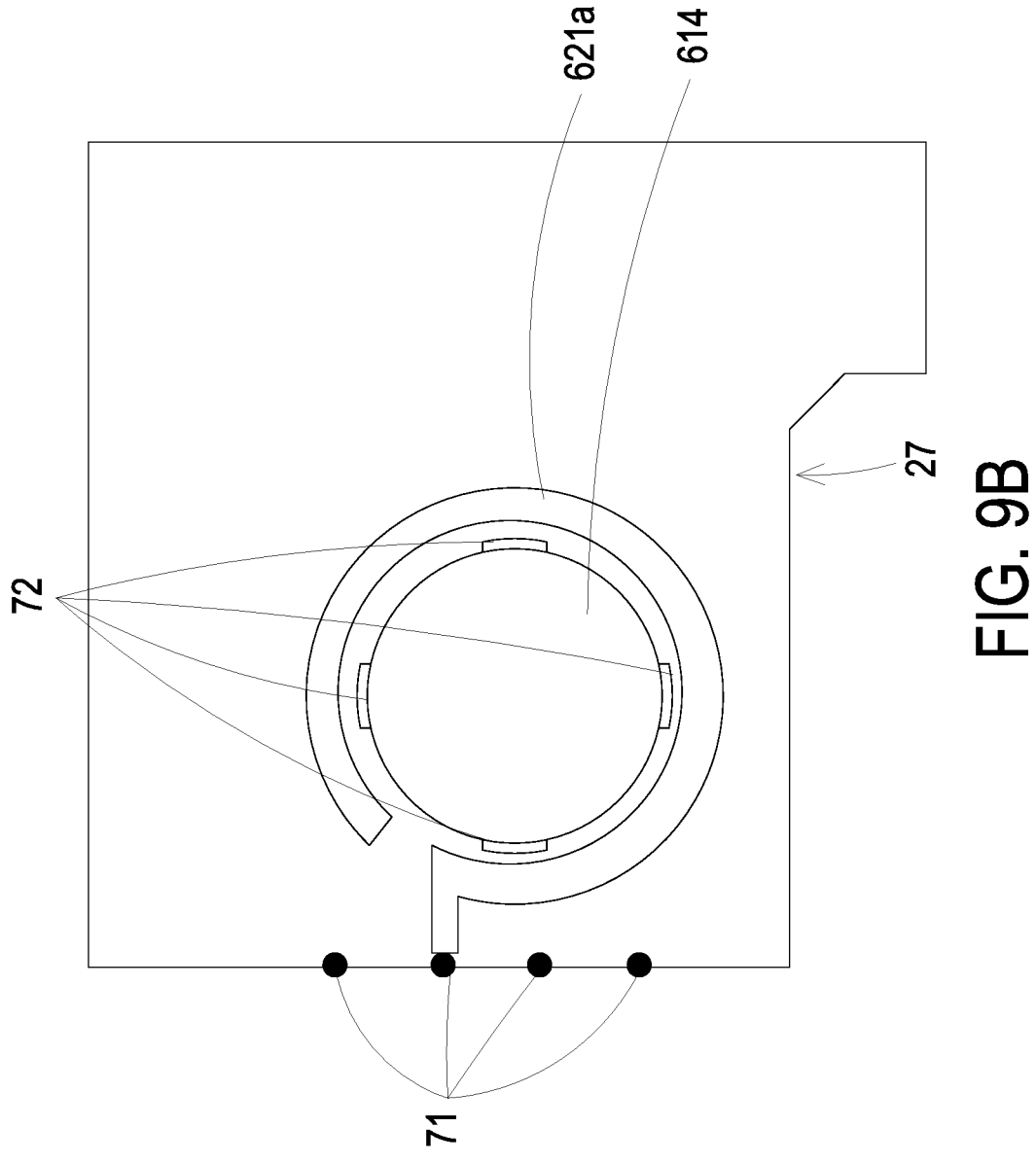
Figure 9C:
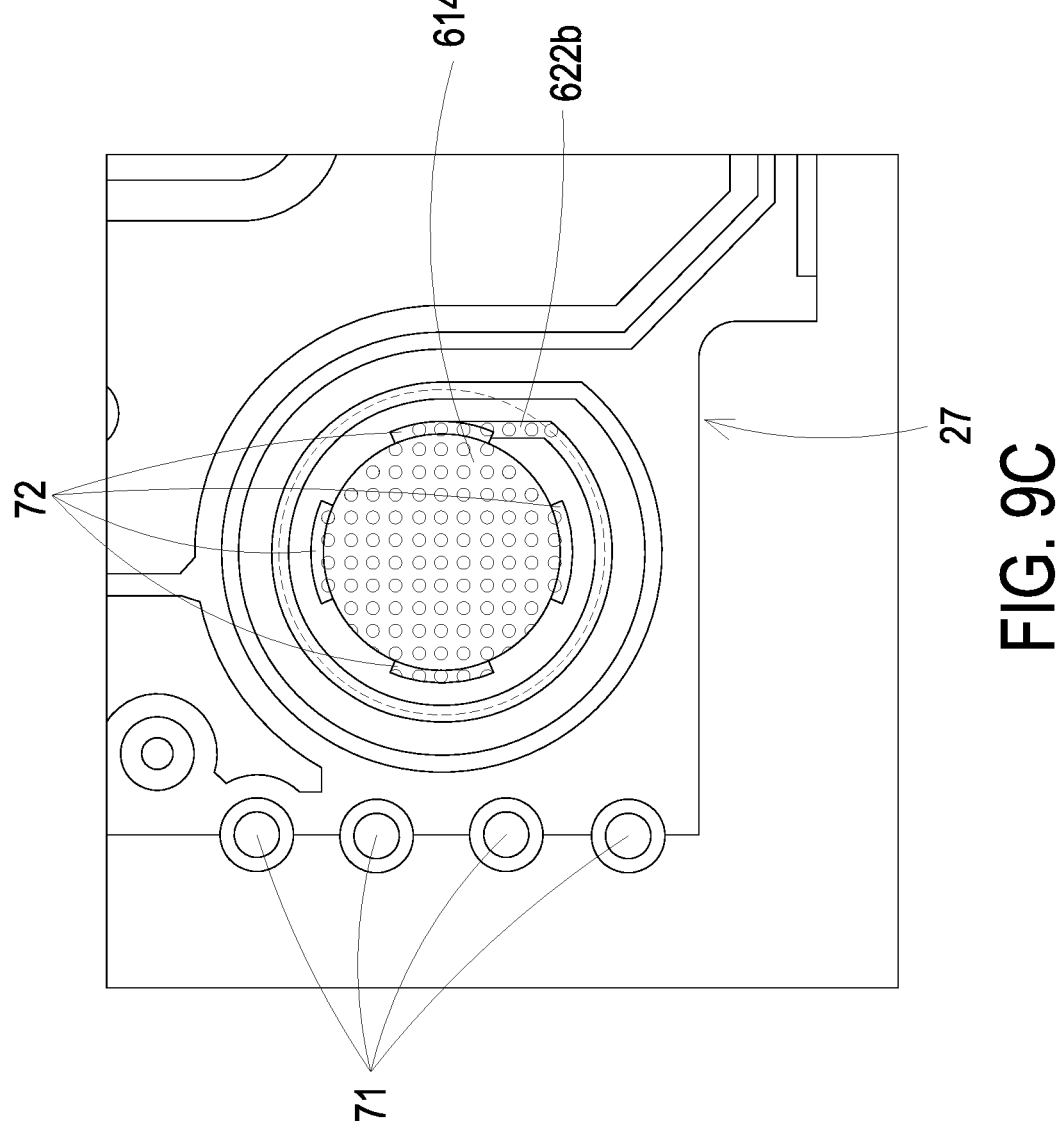
FIG. 9C is a schematic cross-sectional view illustrating the driving transformer and the second winding of the driving transformer in the power conversion module as shown in FIG. 1C.

Please refer to FIGS. 8, 9A, 9B and 9C and also refer to FIGS. 1A, 1B and 1C. FIG. 8 is a schematic cross-sectional view illustrating a portion of a driving transformer and a portion of the circuit board in the power conversion module as shown in FIG. 1C. FIGS. 9A and 9B are schematic cross-sectional views illustrating the driving transformer and the primary winding of the driving transformer in the power conversion module as shown in FIG. 1C. FIG. 9C is a schematic cross-sectional view illustrating the driving transformer and the second winding of the driving transformer in the power conversion module as shown in FIG. 1C.

As shown in FIG. 1C, the circuit board 2 further includes a communication hole 26, a notch 27, a plurality of first electroplated structures 71 and a plurality of second electroplated structures 72. The communication hole 26 runs through the first surface 21 and the second surface 22 of the circuit board 2. Moreover, the communication hole 26 is located near the junction between two lateral surfaces 23 of the circuit board 2. The notch 27 and the plurality of first electroplated structures 71 are located beside the junction between two lateral surfaces 23 of the circuit board 2 and located near the communication hole 26. In this embodiment, the plurality of first electroplated structures 71 are formed on a lateral surface 23 of the circuit board 23, and the notch 27 is formed in another lateral surface 23 of the circuit board 23. The notch 27 is concavely formed in another lateral surface 23 of the circuit board 23. Moreover, each of the first electroplated structures 71 has a portion contacted with the first surface 21 of the circuit board 2 and another portion contacted with the second surface 22 of the circuit board 2.

The plurality of second electroplated structures 72 are formed on the inner surface of the communication hole 26. In this embodiment, the circuit board 2 includes four second electroplated structures 72. Each second electroplated structure 72 is connected between the first surface 21 and the second surface 22 of the circuit board 2. In addition, the second electroplated structures 72 are extended from the first surface 21 of the circuit board 2 to the second surface 22 of the circuit board 2. An interval is formed between each second electroplated structure 72 and the adjacent second electroplated structure 72. Moreover, the plurality of second electroplated structures 72 are discretely arranged on the inner surface of the communication hole 26 at a regular spacing interval.

The power conversion module 1 further includes a driving transformer 6. The driving transformer 6 includes a second magnetic core assembly 61 and a second winding assembly 62 (see FIG. 8). As shown in FIG. 1C, the second magnetic core assembly 61 includes a first magnetic cover 611, a second magnetic cover 612, a first magnetic leg 613 and a second magnetic leg 614. The first magnetic cover 611 is disposed on the first surface 21 of the circuit board 2. The second magnetic cover 612 is disposed on the second surface 22 of the circuit board 2. The first magnetic cover 611 and the second magnetic cover 612 are opposite to each other. The first magnetic leg 613 is connected between the first end of the first magnetic cover 611 and the first end of the second magnetic cover 612. In addition, the first magnetic leg 613 is disposed within the notch 27.

As shown in FIG. 1C, the first magnetic leg 613 includes two sub-legs. One sub-leg of the first magnetic leg 613 is connected with the first magnetic cover 611. The other sub-leg of the first magnetic leg 613 is connected with the second magnetic cover 612. In another embodiment, the first magnetic leg 613 has an integral leg structure.

The second magnetic leg 614 is connected between the second end of the first magnetic cover 611 and the second end of the second magnetic cover 612. The second magnetic leg 614 is penetrated through the communication hole 26. Consequently, the first magnetic cover 611 and the second magnetic cover 612 are fixed on the circuit board 2.

As shown in FIG. 1C, the second magnetic leg 614 includes two sub-legs. One sub-leg of the second magnetic leg 614 is connected with the first magnetic cover 611. The other sub-leg of the second magnetic leg 614 is connected with the second magnetic cover 612. In another embodiment, the second magnetic leg 614 has an integral leg structure.

The second winding assembly 62 includes a primary winding 621 and a secondary winding 622, which are magnetically coupled with each other. Each of the primary winding 621 and the secondary winding 622 includes at least one layer in the circuit board 2. In an embodiment, the primary winding 621 includes a first layer and a second layer in the circuit board 2. The first layer and the second layer are stacked on each other. The secondary winding 622 includes a third layer and a fourth layer. The third layer and the fourth layer are stacked on each other.

As shown in FIGS. 8, 9A and 9B, the primary winding 621 includes a first sub-primary winding 621a and a second sub-primary winding 621b. The first sub-primary winding 621a is formed by the first layer in the circuit board 2. In FIG. 9A, only the first layer of the first sub-primary winding 621a is shown. The first terminal of the first sub-primary winding 621a is electrically connected with one of the first electroplated structures 71. The second terminal of the first sub-primary winding 621a is electrically connected with another of the first electroplated structures 71. The first sub-primary winding 621a is wound around the second magnetic leg 614. The second sub-primary winding 621b is formed by the second layer in the circuit board 2. In FIG. 9B, only the second layer of the second sub-primary winding 621b is shown. The first terminal of the second sub-primary winding 621b is electrically connected with the second terminal of the first sub-primary winding 621a through the corresponding first electroplated structure 71. The second terminal of the second sub-primary winding 621b is electrically connected with another electronic component, which is indicated by black dots. The second sub-primary winding 621b is also wound around the second magnetic leg 614. As mentioned above, the first sub-primary winding 621a and the second sub-primary winding 621b of the primary winding 621 are located at different layers. However, different traces layers of the first sub-primary winding 621a and the second sub-primary winding 621*b* can be electrically connected with each other through the corresponding first electroplated structures 71.

As shown in FIGS. 8 and 9C, the secondary winding 622 includes a first sub-secondary winding 622*a* and a second sub-secondary winding 622*b*. The first sub-secondary winding 622*a* is formed by the third layer in the circuit board 2. In FIG. 9C, only the third layer of the first sub-secondary winding 622*a* is shown. The first terminal of the first sub-secondary winding 622*a* is electrically connected with another electronic component, which is indicated by black dots. The second terminal of the first sub-secondary winding 622*a* is electrically connected with the corresponding second electroplated structure 72. The first sub-secondary winding 622*a* is wound around the second magnetic leg 614.

The second sub-secondary winding 622*b* is formed by the fourth layer in the circuit board 2. In FIG. 9C, only the fourth layer of the second sub-secondary winding 622*b* is shown. The first terminal of the second sub-secondary winding 622*b* is electrically connected with the second terminal of the first sub-secondary winding 622*a* through the corresponding second electroplated structure 72. The second terminal of the second sub-secondary winding 622*b* is electrically connected with another electronic component, which is indicated by black dots. The second sub-secondary winding 622*b* is also wound around the second magnetic leg 614. As mentioned above, the first sub-secondary winding 622*a* and the second sub-secondary winding 622 of the secondary winding 622 are located at different layers. However, different traces layers of the first sub-secondary winding 622*a* and the second sub-secondary winding 622 can be electrically connected with each other through the corresponding second electroplated structure 72.

Figure 10:
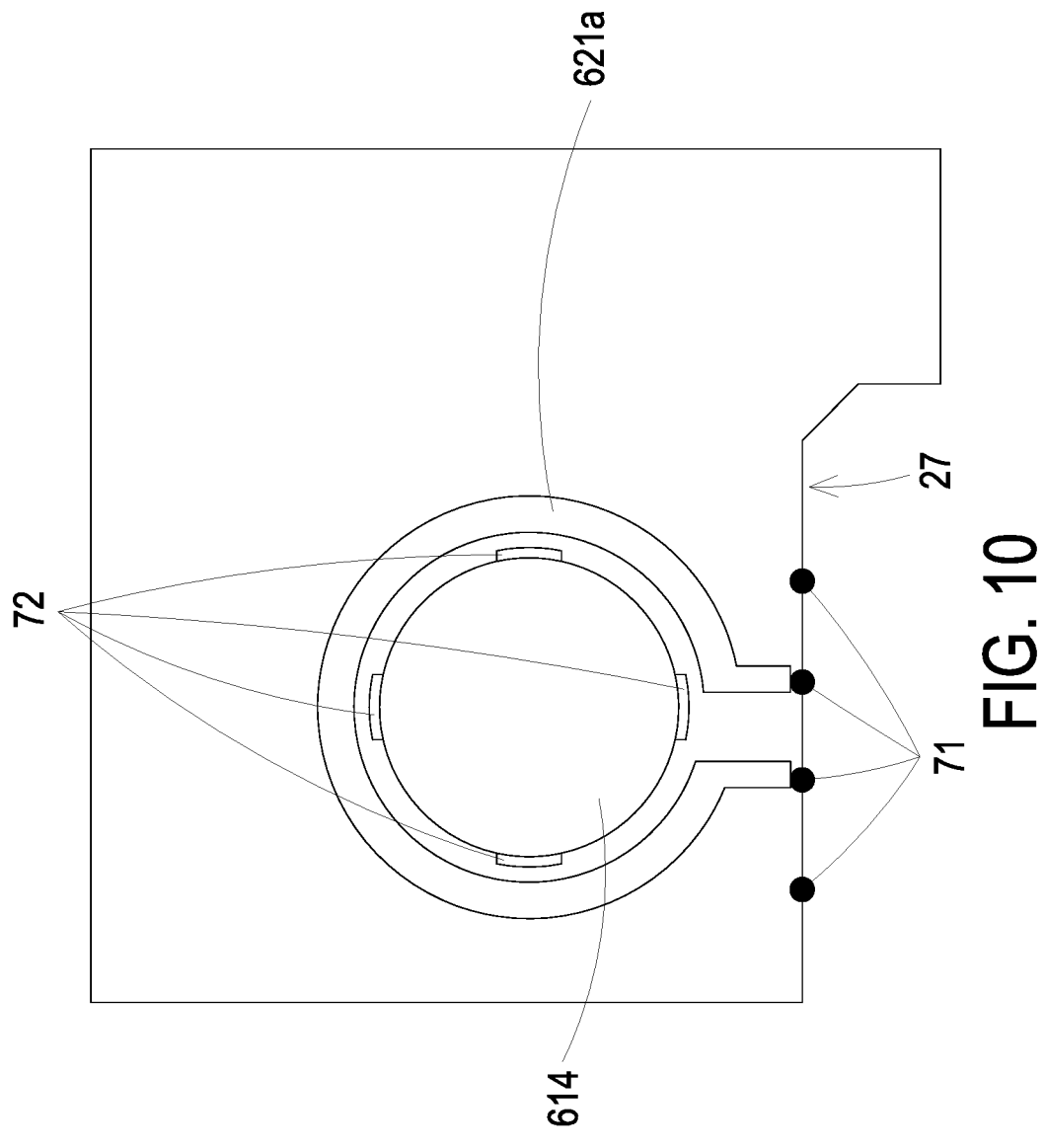
FIG. 10 is a schematic cross-sectional view illustrating a variant example of the driving transformer and a portion of the circuit board in the power conversion module as shown in FIG. 1C.

It is noted that the positions of the first electroplated structures 71 are not restricted. FIG. 10 is a schematic cross-sectional view illustrating a variant example of the driving transformer and a portion of the circuit board in the power conversion module as shown in FIG. 1C. As shown in FIG. 10, the first electroplated structures 71 are disposed on the surface of the notch 27.

Figure 11:
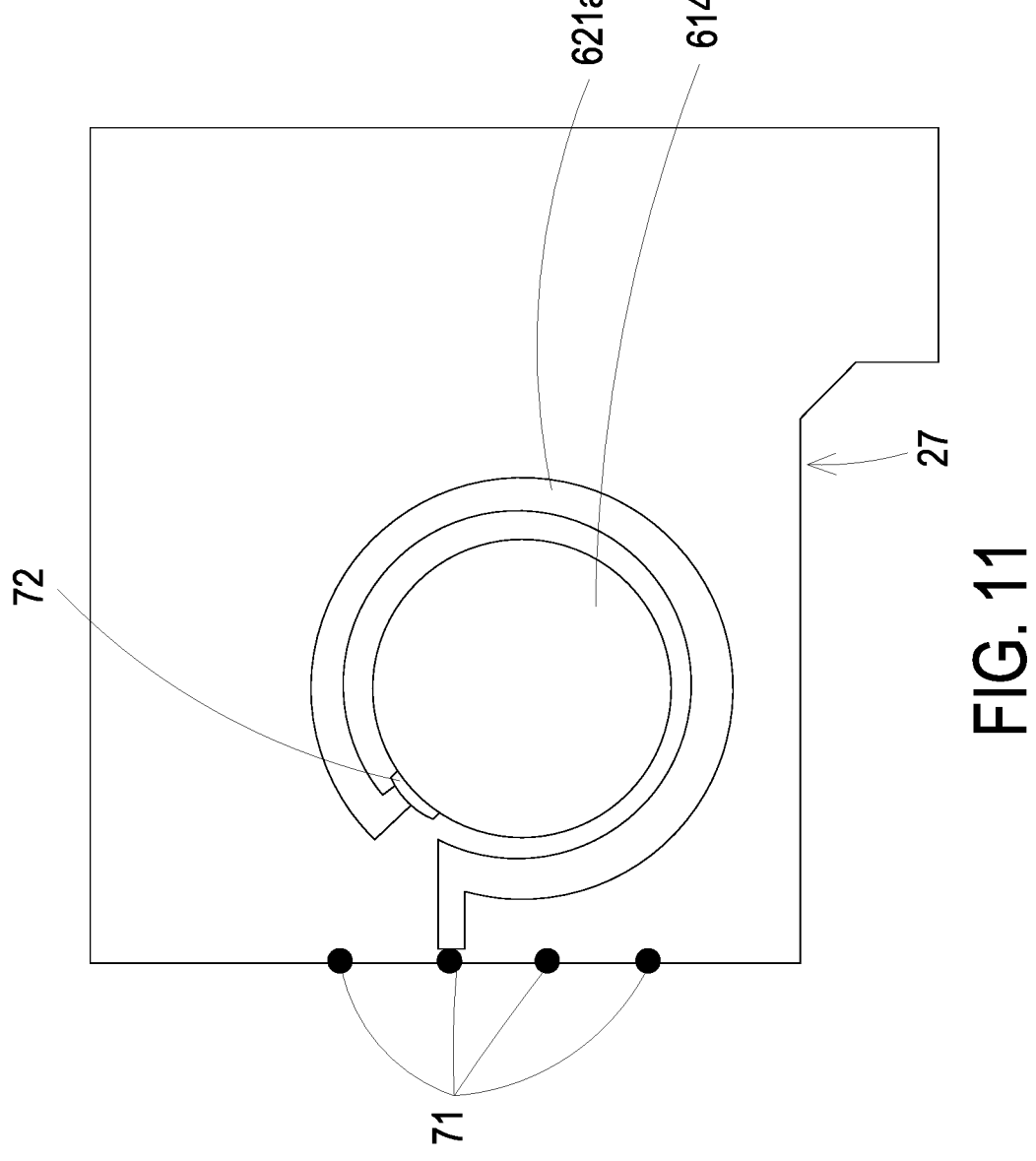
FIG. 11 is a schematic cross-sectional view illustrating another variant example of the driving transformer and a portion of the circuit board in the power conversion module as shown in FIG. 1C.

It is noted that the number of the second electroplated structures 72 is not restricted. FIG. 11 is a schematic cross-sectional view illustrating another variant example of the driving transformer and a portion of the circuit board in the power conversion module as shown in FIG. 1C. As shown in FIG. 11, the circuit board 2 includes a single second electroplated structure 72. The first terminal of the first sub-primary winding 621*a* of the primary winding 621 is electrically connected with the corresponding first electroplated structure 71. The second terminal of the first sub-primary winding 621*a* of the primary winding 621 is electrically connected with the second electroplated structure 72. The first sub-primary winding 621*a* is electrically connected with other layers through the corresponding first electroplated structure 71 and the second electroplated structure 72. The first sub-primary winding 621*a* of the primary winding 621 is also wound around the second magnetic leg 614.

From the above descriptions, the present disclosure provides a power conversion module. The magnetic core assembly and the winding assembly of the magnetic device in the power conversion module are specially designed. Consequently, the voltage reduction functions of the transformer can be achieved. Moreover, the volume of the magnetic device is effectively reduced, and the integration of the magnetic device is enhanced. Consequently, the power conversion module has the advantages of low output ripple, small volume, high efficiency and simplified applications.

Moreover, the arrangement of the plurality of coupled windings is specially designed. Consequently, the coupling coefficient of the plurality of coupled windings is largely increased, the leakage inductance of the plurality of coupled windings is reduced, and the DC/AC loss of the plurality of coupled windings is largely reduced. Moreover, due to the arrangement of the electroplated structures, different layers of driving transformer can be electrically connected with each other. Consequently, the layout space of the driving transformer on the circuit board is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic device, comprising:

a magnetic core assembly comprising a first lateral side, a second lateral side, a third lateral side, a fourth lateral side, a first magnetic cover, a second magnetic cover, a first magnetic leg and a second magnetic leg, wherein the first lateral side and the second lateral side are opposite to each other, the third lateral side and the fourth lateral side are opposite to each other, and the third lateral side and the fourth lateral side are arranged between the first lateral side and the second lateral side, wherein the first magnetic cover and the second magnetic cover are opposite to each other, the first magnetic leg is arranged between a first end of the first magnetic cover and a first end of the second magnetic cover, the second magnetic leg is arranged between a second end of the first magnetic cover and a second end of the second magnetic cover, a channel is formed between the first magnetic leg and the second magnetic leg, and the channel is in communication with the third lateral side and the fourth lateral side of the magnetic core assembly; and a winding assembly comprising two coupled windings, wherein each of the two coupled windings comprises a first sub-winding, a second sub-winding and a third sub-winding, wherein a first terminal of the first sub-winding is located beside the fourth lateral side of the magnetic core assembly, a second terminal of the first sub-winding is located beside the third lateral side of the magnetic core assembly, and the first sub-winding goes through the channel, wherein a first terminal of the second sub-winding is connected with the second terminal of the first sub-winding and located beside the third lateral side of the magnetic core assembly, a second terminal of the second sub-winding is located beside the fourth lateral side of the magnetic core assembly, a portion of the second sub-winding is further located beside the first lateral side of the magnetic core assembly, and the second sub-winding is wound around the first magnetic leg, wherein a first terminal of the third sub-winding is connected with the second terminal of the first sub-winding, the first terminal of the third sub-winding is located beside the third lateral side of the magnetic core assembly, a second terminal of the third sub-winding is located beside the fourth lateral side of the magnetic core assembly, a portion of the third sub-winding is further located beside the second lateral side of the magnetic core assembly, the third sub-winding is wound around the second magnetic leg, and the second terminal of the third sub-winding is connected with the second terminal of the second sub-winding.

2. The magnetic device according to claim 1, wherein the two coupled windings include a first output winding and a second output winding, wherein the first output winding has a first projection region on a reference surface, the second output winding has a second projection region on the reference surface, and the first projection region and the second projection region are at least partially overlapped with each other, wherein a length of an overlap region between the first projection region and the second projection region is greater than or equal to 60% of a length of the first output winding.

3. The magnetic device according to claim 2, wherein the magnetic device is disposed on a circuit board, the first output winding is formed by a plurality of layers in the circuit board, and the second output winding is formed by a plurality of layers in the circuit board, wherein at least one layer forming the second output winding is arranged between the plurality of layers forming the first output winding, so that the plurality of layers forming the first output winding and the plurality of layers forming the second output winding are stacked.

4. The magnetic device according to claim 2, wherein the magnetic device is disposed on a circuit board, the winding assembly further comprises an input winding, and the circuit board comprises a first trace and a second trace, wherein a first terminal of the input winding is located beside the fourth lateral side of the magnetic core assembly, a second terminal of the input winding is located beside the third lateral side of the magnetic core assembly, the second terminal of the input winding is electrically connected with a first terminal of the a first sub-resonant capacitor and a first terminal of a second sub-resonant capacitor, and the input winding goes through the channel, wherein a first terminal of the first trace is electrically connected with a second terminal of the first sub-resonant capacitor and located beside the third lateral side of the magnetic core assembly, a second terminal of the first trace is located beside the fourth lateral side of the magnetic core assembly, a portion of the first trace is located beside the first lateral of the magnetic core assembly, and the first trace is wound around the first magnetic leg, wherein a first terminal of the second trace is electrically connected with a second terminal of the second sub-resonant capacitor and located beside the third lateral side of the magnetic core assembly, a second terminal of the second trace is located beside the fourth lateral side of the magnetic core assembly, a portion of the second trace is located beside the second lateral side of the magnetic core assembly, the second trace is wound around the second magnetic leg, and the second terminal of the second trace is electrically connected with the second terminal of the first trace.

5. The magnetic device according to claim 4, wherein the input winding, the first trace and the second trace are collaboratively formed as a current loop, the first output winding has a first projection region on a reference surface, the second output winding has a second projection region on the reference surface, and the current loop has a third projection region on the reference surface, wherein the first projection region, the second projection region and the third projection region are partially overlapped with each other, and a length of an overlap region between the third projection region and the first projection region is greater than or equal to 60% of a length of the first output winding.

6. The magnetic device according to claim 5, wherein the current loop is formed by at least one layer in the circuit board, and the least one layer forming the current loop is arranged between any two layers forming the at least three layers of the first output winding and the at least three layers forming the second output winding.

7. The magnetic device according to claim 1, wherein the magnetic device is disposed on a circuit board, and the circuit board comprises a first surface, a second surface and a first accommodation space, wherein the first accommodation space is concavely formed in the first surface of the circuit board, the first magnetic cover is disposed on the first surface, a portion of the first magnetic cover is accommodated within the first accommodation space, the second magnetic cover is disposed on the second surface of the circuit board, and the first magnetic cover and the second magnetic cover are fixed on the circuit board.

8. The magnetic device according to claim 7, wherein a distance between a surface of the first magnetic cover and the first surface of the circuit board is smaller than a thickness of the first magnetic cover.

9. The magnetic device according to claim 7, wherein the two coupled windings include a first output winding and a second output winding, wherein the first output winding is formed by at least three layers in the circuit board, and the second output winding is formed by at least three layers in the circuit board, wherein at least one layer of the second output winding is arranged between the plurality of layers forming the first output winding, so that the at least three layers forming the first output winding and the at least three layers forming the second output winding are stacked.

10. The magnetic device according to claim 9, wherein the winding assembly further comprise an input winding, and the circuit board comprises a first trace and a second trace, wherein the input winding, the first trace and the second trace are formed by at least one layer in the circuit board, and the least one layer forming the input winding, the first trace and the second trace is arranged between any two layers of the at least three layers forming the first output winding and the at least three layers forming the second output winding.

11. An electronic device, comprising:

a circuit board having a first surface and a second surface, wherein the first surface and the second surface are opposite to each other; and a magnetic device comprising:

a magnetic core assembly comprising a first lateral side, a second lateral side, a third lateral side, a fourth lateral side, a first magnetic cover, a second magnetic cover, a first magnetic leg and a second magnetic leg, wherein the first lateral side and the second lateral side are opposite to each other, the third lateral side and the fourth lateral side are opposite to each other, and the third lateral side and the fourth lateral side are arranged between the first lateral side and the second lateral side, wherein the first magnetic cover and the second magnetic cover are opposite to each other, the first magnetic leg is arranged between a first end of the first magnetic cover and a first end of the second magnetic cover, the second magnetic leg is arranged between a second end of the first magnetic cover and a second end of the second magnetic cover, a channel is formed between the first magnetic leg and the second magnetic leg, and the channel is in communication with the third lateral side and the fourth lateral side of the magnetic core assembly; and a winding assembly disposed within the circuit board, and comprising two coupled windings, wherein each of the two coupled windings comprises a first sub-winding, a second sub-winding and a third sub-winding, wherein a first terminal of the first sub-winding is located beside the fourth lateral side of the magnetic core assembly, a second terminal of the first sub-winding is located beside the third lateral side of the magnetic core assembly, and the first sub-winding goes through the channel, wherein a first terminal of the second sub-winding is connected with the second terminal of the first sub-winding and located beside the third lateral side of the magnetic core assembly, a second terminal of the second sub-winding is located beside the fourth lateral side of the magnetic core assembly, a portion of the second sub-winding is further located beside the first lateral side of the magnetic core assembly, and the second sub-winding is wound around the first magnetic leg, wherein a first terminal of the third sub-winding is connected with the second terminal of the first sub-winding, the first terminal of the third sub-winding is located beside the third lateral side of the magnetic core assembly, a second terminal of the third sub-winding is located beside the fourth lateral side of the magnetic core assembly, a portion of the third sub-winding is further located beside the second lateral side of the magnetic core assembly, the third sub-winding is wound around the second magnetic leg, and the second terminal of the third sub-winding is connected with the second terminal of the second sub-winding.

12. The electronic device according to claim 11, wherein the two coupled windings include a first output winding and a second output winding, and the electronic device further comprises a first ground switch, a second ground switch and an output capacitor, wherein the first ground switch, the second ground switch and the output capacitor are located beside the fourth lateral side of the magnetic core assembly, the first ground switch, the first output winding and the output capacitor are collaboratively formed as a first closed loop, and the second ground switch, the second output winding and the output capacitor are collaboratively formed as a second closed loop.

13. The electronic device according to claim 12, wherein a terminal of the first output winding connecting to the output capacitor and a terminal of the second output winding connecting to the second ground switch are dotted terminals.

14. The electronic device according to claim 12, wherein a drain terminal of the first ground switch is electrically connected with the first output winding, a source terminal of the first ground switch is electrically connected with the output capacitor, a drain terminal of the second ground switch is electrically connected with the second output winding, and a source terminal of the second ground switch is electrically connected with the output capacitor.

15. The electronic device according to claim 12, wherein the first ground switch and the second ground switch are located beside each other, and an arrangement direction of the first ground switch and the second ground switch is perpendicular with the fourth lateral side of the magnetic core assembly.

16. The electronic device according to claim 12, wherein the first ground switch is arranged between the fourth lateral side of the magnetic core assembly and the output capacitor, and the second ground switch is arranged between the fourth lateral side of the magnetic core assembly and the output capacitor.

17. The electronic device according to claim 12, wherein the electronic device further comprises a sub-resonant capacitor and a second sub-resonant capacitor, and the first sub-resonant capacitor and the second sub-resonant capacitor are located beside the third lateral side of the magnetic core assembly, wherein the winding assembly further comprises an input winding, and the circuit board comprises a first trace and a second trace, wherein a first terminal of the input winding is located beside the fourth lateral side of the magnetic core assembly, a second terminal of the input winding is located beside the third lateral side of the magnetic core assembly, the second terminal of the input winding is electrically connected with a first terminal of the first sub-resonant capacitor and a first terminal of the second sub-resonant capacitor, and the input winding goes through the channel, wherein a first terminal of the first trace is electrically connected with a second terminal of the first sub-resonant capacitor, the first terminal of the first trace is located beside the third lateral side of the magnetic core assembly, a second terminal of the first trace is located beside the fourth lateral side of the magnetic core assembly, a portion of the first trace is located beside the first lateral side of the magnetic core assembly, and the first trace is wound around the first magnetic leg, wherein a first terminal of the second trace is electrically connected with a second terminal of the second sub-resonant capacitor, the first terminal of the second trace is located beside the third lateral side of the magnetic core assembly, a second terminal of the second trace is located beside the fourth lateral side of the magnetic core assembly, a portion of the second trace is located beside the second lateral side of the magnetic core assembly, the second trace is wound around the second magnetic leg, and the second terminal of the second trace is electrically connected with the second terminal of the first trace.

18. The electronic device according to claim 12, wherein the electronic device comprises a first switch, a second switch, a third switch, a fifth switch, a sixth switch and a seventh switch, wherein the first switch, the second switch, the third switch and the first ground switch are sequentially connected in series to form a first bridge arm, and the fifth switch, the sixth switch, the seventh switch and the second ground switch are sequentially connected in series to form a second bridge arm.

19. The electronic device according to claim 18, wherein the first switch, the second switch, the third switch and the first ground switch of the first bridge arm and the fifth switch, the sixth switch, the seventh switch and the second ground switch of the second bridge arm are disposed on the first surface of the circuit board, wherein the first switch, the second switch, the third switch and the first ground switch of the first bridge arm are arranged around the first lateral side of the magnetic core assembly and a portion of the fourth lateral side of the magnetic core assembly, wherein the fifth switch, the sixth switch, the seventh switch and the second ground switch of the second bridge arm are arranged around the second lateral side of the magnetic core assembly and another portion of the fourth lateral side of the magnetic core assembly.

20. The electronic device according to claim 12, wherein the electronic device comprises a second switch, a third switch, a sixth switch and a seventh switch, wherein the second switch, the third switch, and the first ground switch are sequentially connected in series to form a first bridge arm, and the sixth switch, the seventh switch and the second ground switch are sequentially connected in series to form a second bridge arm.

21. The electronic device according to claim 11, wherein the circuit board comprises a first accommodation space and a second accommodation space, wherein the first accommodation space is concavely formed in the first surface of the circuit board, and the second accommodation space is concavely formed in the second surface of the circuit board, wherein a portion of the first magnetic cover is accommodated within the first accommodation space, the second magnetic cover is disposed on the second surface of the circuit board, and a portion of the second magnetic cover is accommodated within the second accommodation space.

22. The electronic device according to claim 21, wherein a distance between a surface of the first magnetic cover and the first surface of the circuit board is smaller than a thickness of the first magnetic cover.

23. The electronic device according to claim 11, wherein the electronic device is a power conversion module.

* * * * *